United States Patent
Tabuchi

(10) Patent No.: US 9,964,732 B1
(45) Date of Patent: May 8, 2018

(54) METHODS AND APPARATUS FOR ACTUATOR CONTROL

(71) Applicant: SEMICONDUCTOR COMPONENTS INDUSTRIES, LLC, Phoenix, AZ (US)

(72) Inventor: Yoshihisa Tabuchi, Gifu (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days. days.

(21) Appl. No.: 15/595,024

(22) Filed: May 15, 2017

(51) Int. Cl.
| | |
|---|---|
| G02B 7/04 | (2006.01) |
| H02P 7/28 | (2016.01) |
| G02B 7/10 | (2006.01) |
| G02B 15/14 | (2006.01) |
| H02P 6/00 | (2016.01) |
| H02P 6/182 | (2016.01) |
| H02P 6/26 | (2016.01) |
| H02P 7/02 | (2016.01) |
| H02P 7/06 | (2006.01) |
| G02B 7/28 | (2006.01) |

(52) U.S. Cl.
CPC .............. *G02B 7/102* (2013.01); *G02B 15/14* (2013.01); *H02P 6/006* (2013.01); *H02P 6/182* (2013.01); *H02P 6/26* (2016.02); *H02P 7/02* (2016.02); *H02P 7/06* (2013.01); *H02P 7/28* (2013.01); *G02B 7/28* (2013.01)

(58) Field of Classification Search
None
See application file for complete search history.

(56) References Cited

U.S. PATENT DOCUMENTS

| | | | | |
|---|---|---|---|---|
| 4,658,194 A | * | 4/1987 | Richter | ..................... H02P 8/14 318/685 |
| 2009/0230905 A1 | * | 9/2009 | Proctor | ................... H02P 6/182 318/400.09 |
| 2013/0169857 A1 | * | 7/2013 | Christo | .............. H04N 5/23212 348/349 |
| 2014/0355119 A1 | | 12/2014 | Matsumoto | |
| 2014/0355973 A1 | * | 12/2014 | Cadugan | ................ G03B 13/34 396/133 |
| 2015/0022139 A1 | | 1/2015 | Yamanaka | |
| 2015/0123591 A1 | | 5/2015 | Inoue | |

FOREIGN PATENT DOCUMENTS

| | | |
|---|---|---|
| JP | 2007192929 A | 2/2007 |
| JP | 2008178242 A | 7/2008 |

\* cited by examiner

*Primary Examiner* — W B Perkey
(74) *Attorney, Agent, or Firm* — The Noblitt Group, PLLC; Hettie L. Haines

(57) ABSTRACT

Various embodiments of the present technology may comprise a method and apparatus for actuator control. The methods and apparatus may comprise various digital signal processing functions to detect a back EMF (electromotive force) and compute a countermeasure value to reduce ringing. The methods and apparatus for actuator control may apply a drive signal corresponding to the countermeasure value. The magnitude and direction of the drive signal provided at particular times during operation may facilitate a shorter settling time.

20 Claims, 19 Drawing Sheets

METHODS AND APPARATUS FOR ACTUATOR CONTROL

BACKGROUND OF THE TECHNOLOGY

Electronic devices, such as cellular telephones, cameras, and computers, commonly use a lens module in conjunction with an image sensor to capture images. Many imaging systems employ autofocus methods and various signal processing techniques to improve image quality by adjusting the position of the lens relative to the image sensor.

Autofocus systems generally operate in conjunction with an actuator to move the lens to an optimal position to increase the image quality. Many electronic devices utilize low-noise linear motion, such as linear actuators, to facilitate autofocus. Due to the mechanical properties of the linear actuator, however, the settling time of the actuator may be greater than desired due to the back electromotive force (back EMF) that is induced by external vibrations on the actuator.

SUMMARY OF THE INVENTION

Various embodiments of the present technology may comprise methods and apparatus for actuator control. The methods and apparatus may comprise various digital signal processing functions to detect a back EMF (electromotive force) and compute a countermeasure value to reduce ringing. The apparatus for actuator control may apply a drive signal corresponding to the countermeasure value. The magnitude and direction of the drive signal provided at particular times during operation may facilitate a shorter settling time.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

FIG. 1 representatively illustrates an imaging system in accordance with an exemplary embodiment of the present technology;

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various actuators, sensors, lenses, semiconductor devices, such as transistors and capacitors, and the like, which may carry out a variety of functions. In addition, the present technology may be practiced in conjunction with any number of systems, such as automotive, aerospace, medical, scientific, surveillance, and consumer electronics, and the systems described are merely exemplary applications for the technology. Further, the present technology may employ any number of conventional techniques for capturing image data, sampling image data, processing image data, and the like.

Figure 1:
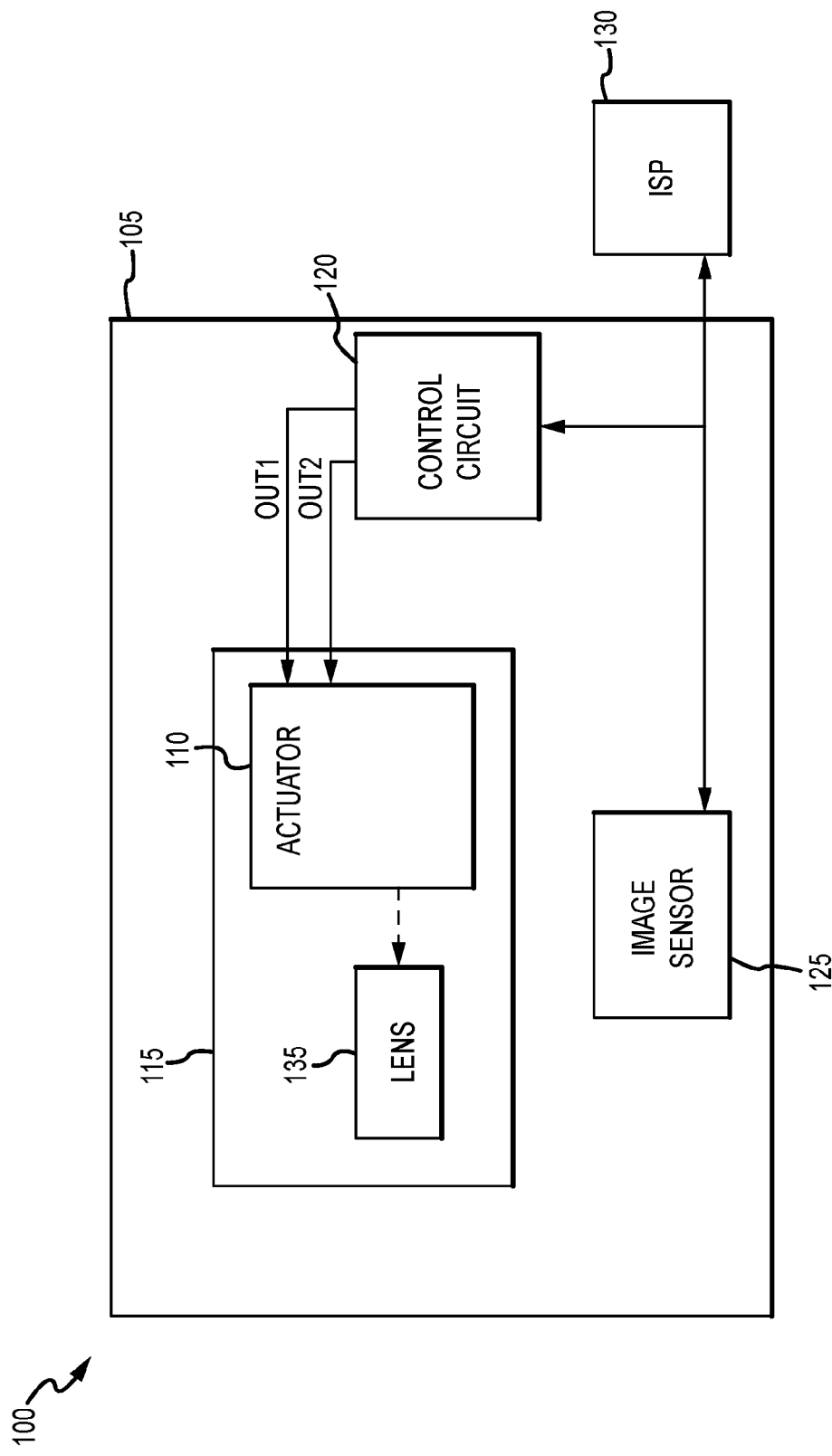
Figure 2:
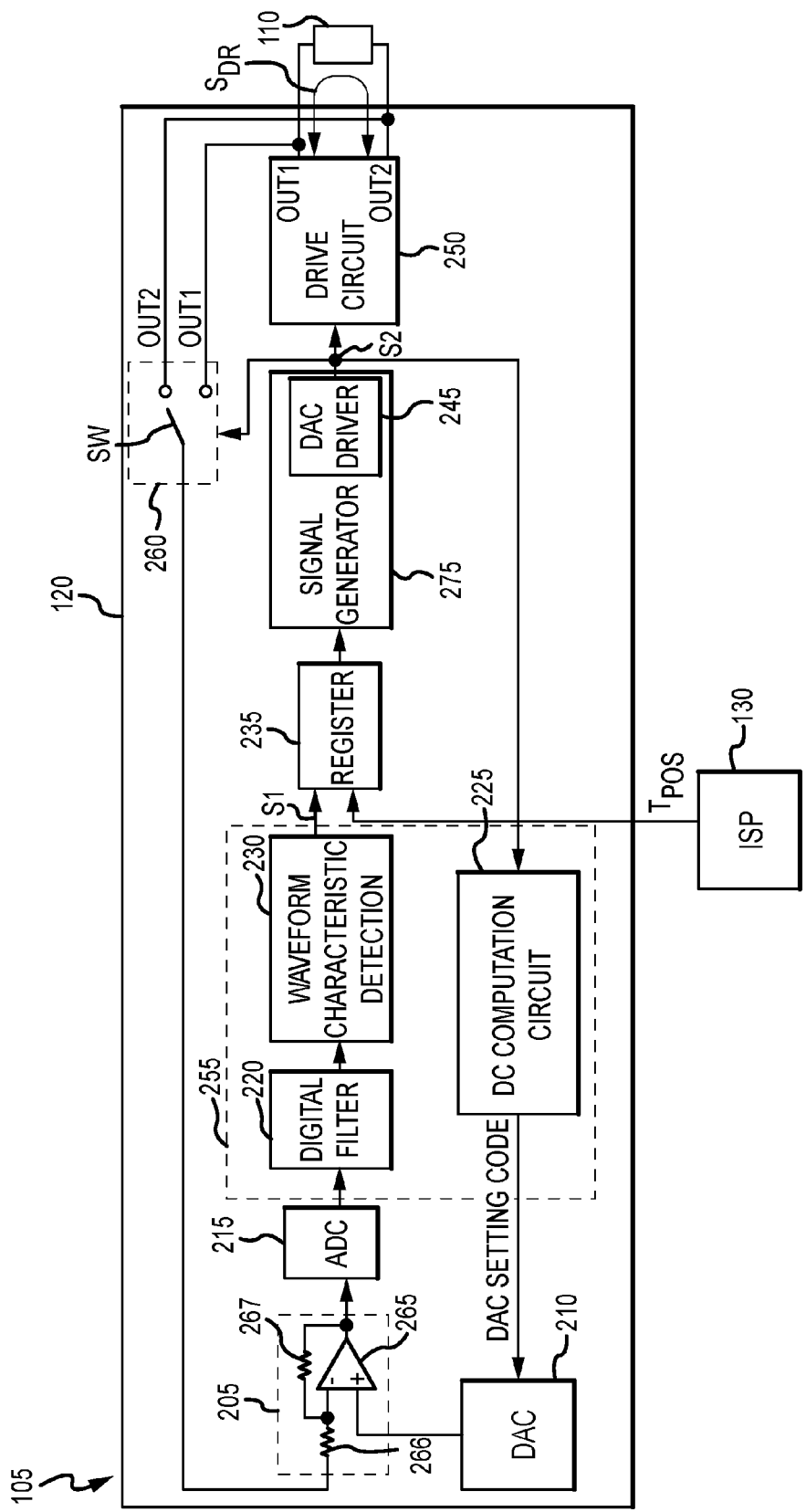
FIG. 2 is a block diagram of an autofocus control system in accordance with an exemplary embodiment of the present technology.

Methods and apparatus for actuator control according to various aspects of the present technology may operate in conjunction with any suitable electronic system, such as imaging systems, "smart devices," wearables, consumer electronics, and the like. Referring to FIGS. 1 and 2, an exemplary imaging system 100 may be incorporated into an electronic device, such as a digital camera or portable computing device. For example, in various embodiments, the imaging system 100 may comprise a camera module 105 and an image signal processor (ISP) 130.

The camera module 105 may capture image data and perform various operating functions, such as autofocus and/or optical image stabilization. For example, the camera module 105 may comprise an image sensor 125, a lens module 115 positioned adjacent to the image sensor 125, and a control circuit 120. The control circuit 120 and the lens module 115 may be configured to communicate with each other and operate together to automatically focus an object or a scene on the image sensor 125.

The image sensor 125 may be suitably configured to capture image data. For example, the image sensor 125 may comprise a pixel array (not shown) to detect the light and convey information that constitutes an image by converting the variable attenuation of light waves (as they pass through or reflect off the object) into electrical signals. The pixel array may comprise a plurality of pixels arranged in rows and columns, and the pixel array may contain any number of rows and columns, for example, hundreds or thousands of rows and columns. Each pixel may comprise any suitable photosensor, such as a photogate, a photodiode, and the like, to detect light and convert the detected light into a charge. The image sensor 125 may be implemented in conjunction with any appropriate technology, such as active pixel sensors in complementary metal-oxide-semiconductors (CMOS) and charge-coupled devices.

Figure 3:
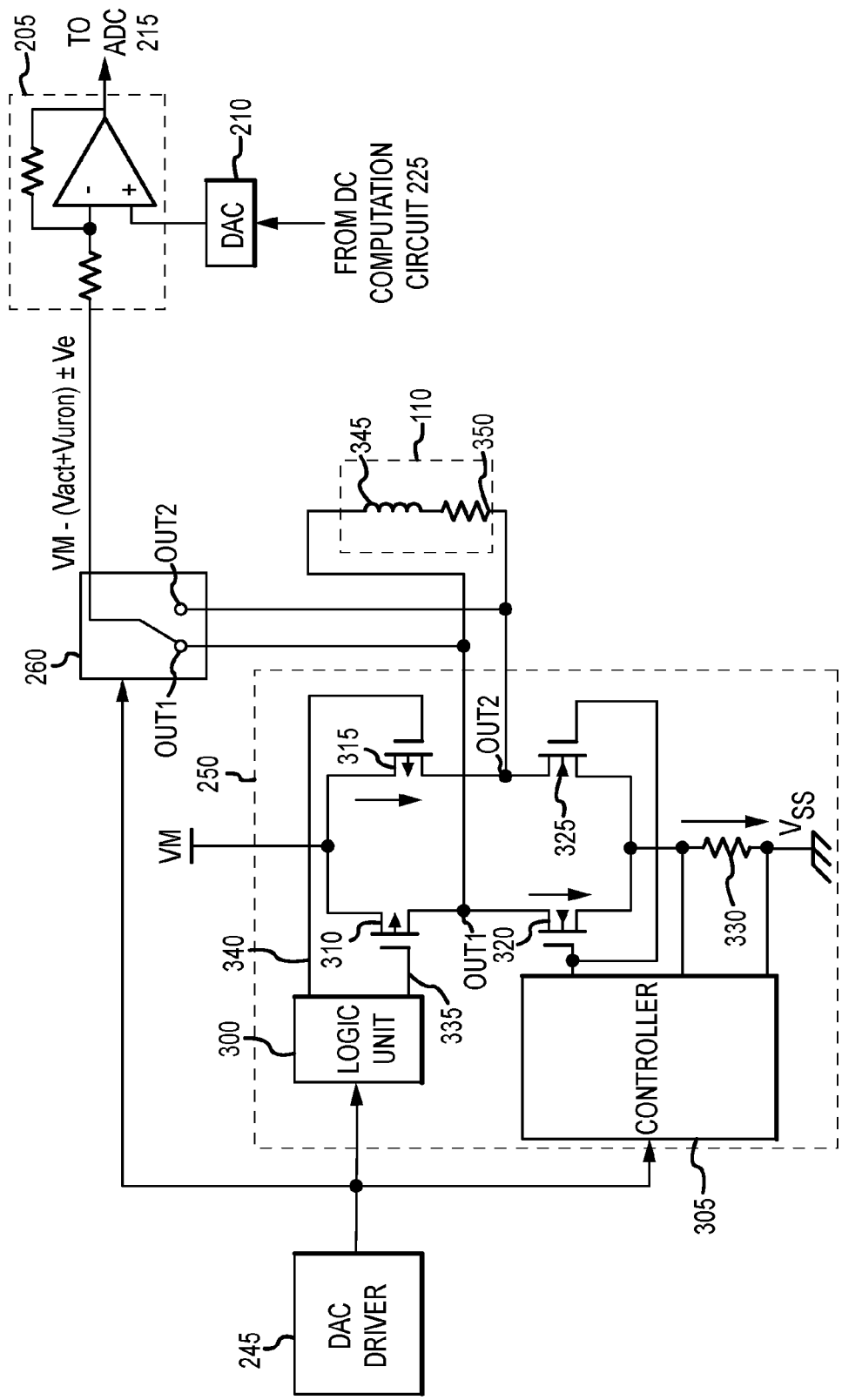
FIG. 3 is a circuit diagram of an autofocus system with a current flowing from a second output terminal to a first output terminal in accordance with an exemplary embodiment of the present technology.
Figure 4:
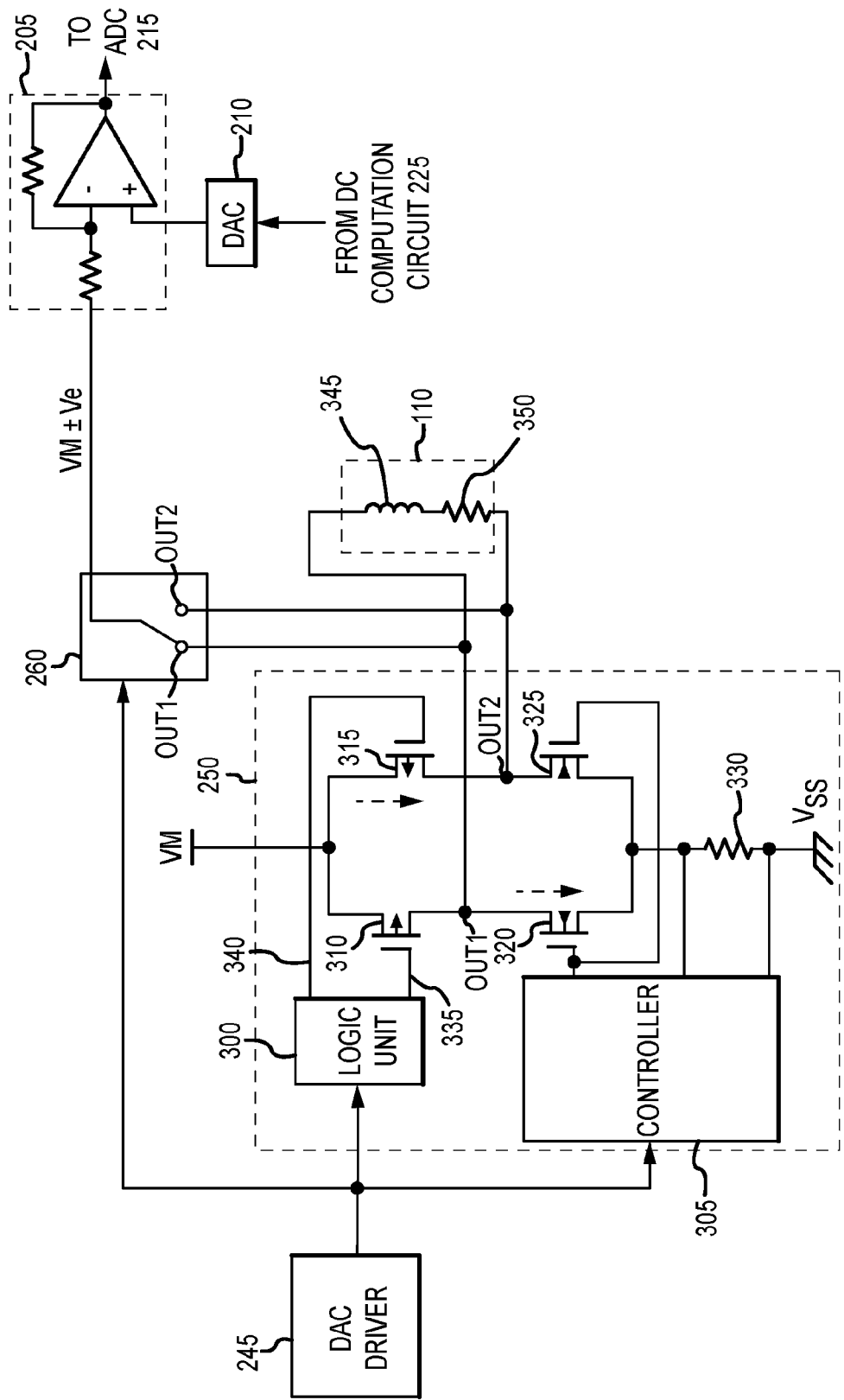
FIG. 4 is a circuit diagram of the autofocus system with the first output terminal selected and no current flowing in accordance with an exemplary embodiment of the present technology.

The lens module 115 may be configured to focus light on a sensing surface of the image sensor 125. For example, the lens module 115 may comprise a lens 135, with a fixed diameter, positioned adjacent to the sensing surface of the image sensor 125. The lens module 115 may further comprise an actuator 110, for example a linear resonant actuator, such as a voice coil motor (VCM), configured to move the lens 135 along an x-, y-, and, z-axis. The actuator 110 may be represented as an inductor 345 in series with a resistor 350 (FIG. 3).

In various embodiments, the imaging system 100 is configured to move portions of the lens module 115 that secure the lens 135 to perform autofocus functions. For example, the lens module 115 may comprise a telescoping portion (not shown) that moves relative to a stationary portion (not shown). In various embodiments, the telescoping portion may secure the lens 135. As such, the actuator 110 may move the telescoping portion to shift the lens 135 away from or closer to the image sensor 125 to focus the object or scene on the image sensor 125. In various embodiments, the image sensor 125 may be fixed to the stationary portion or may be arranged at a fixed distance from the stationary portion.

In various embodiments, the image signal processor 130 may perform various digital signal processing functions, such as color interpolation, color correction, facilitate autofocus, exposure adjustment, noise reduction, white balance adjustment, compression, and the like, to produce an output image. The image signal processor 130 may comprise any number of semiconductor devices, such as transistors, capacitors, and the like, for performing calculations, transmitting and receiving image pixel data, and a storage unit, such as random-access memory, non-volatile memory or any other memory device suitable for the particular application, for storing pixel data. In various embodiments, the image signal processor 130 may be implemented with a programmable logic device, such as a field programmable gate array (FPGA) or any other device with reconfigurable digital circuits. In other embodiments, the image signal processor 130 may be implemented in hardware using non-programmable devices. The image signal processor 130 may be formed partially or entirely within an integrated circuit in silicon using any suitable complementary metal-oxide semiconductor (CMOS) techniques or fabrication processes, in an ASIC (application-specific integrated circuit), using a processor and memory system, or using another suitable implementation.

The image signal processor 130 may transmit the output image to an output device, such as a display screen or a memory component, for storing and/or viewing the image data. The output device may receive digital image data, such as video data, image data, frame data, and/or gain information from the image signal processor 130. In various embodiments, the output device may comprise an external device, such as a computer display, memory card, or some other external unit.

The control circuit 120 controls and supplies power to various devices within the system. For example, the control circuit 120 may control and supply power to the lens module 115 to move the actuator 110 to a target position. The control circuit 120 may operate in conjunction with the image signal processor 130 and the image sensor 125 to determine the appropriate amount of power to supply to the actuator 110. The control circuit 120 may supply a current, having a magnitude and direction, to the actuator 110. In general, the actuator 110 responds to the current by moving the lens 135 an amount that is proportion to the amount of power supplied by the control circuit 120. The control circuit 120 may receive and respond to various signals to determine an appropriate position for the lens 135. For example, the control circuit 120 may receive a target position signal from the image sensor 125 and/or the image signal processor 130 related to the target position of the lens 135. The control circuit 120 may comprise any suitable device and/or system capable of providing energy to the actuator 110.

The control circuit 120 may further comprise various circuits and/or systems to decrease the length of time it takes the actuator 110 (and the lens 135) to reach the target position. In general, once the control circuit 120 receives the target position signal from the image signal processor 130, the actuator 110 (and the lens 135) oscillates for a period of time before it settles into the desired target position. This period of time may be referred to as the settling time. In various embodiments, the control circuit 120 may comprise any suitable device and/or system suitably adapted to decrease the settling time. For example, the control circuit 120 may comprise an amplifier circuit 205, a digital signal processing circuit 255, a register 235, a signal generator 275, a switch 260, and a drive circuit 250. The control circuit 120 may further comprise at least one signal converter. For example, the control circuit 120 may comprise a first digital-to-analog converter (DAC) 210 and an analog-to-digital converter (ADC) 215.

The amplifier circuit 205 may be configured to amplify a signal, such as a signal from the switch 260. The amplifier circuit 205 may comprise any suitable circuit and/or system for amplifying a signal. For example, the amplifier circuit 205 may be configured as a variable gain amplifier comprising an operational amplifier 265 with a negative feedback configuration having a non-inverting input, an inverting input, and an output. The inverting input may be connected to the output of operational amplifier 265 through a first resistor 267, and to a second resistor 266. The non-inverting input of operational amplifier 265 may be connected to the first DAC 210. The first and second resistors 267, 266 may have variable or fixed resistance values. An output 270 of the amplifier circuit 205 may be coupled to the ADC 215.

The ADC 215 receives an analog signal and converts the analog signal to a digital signal. The ADC 215 may comprise any suitable system, device, or ADC architecture. The ADC 215 may be coupled in series with the amplifier circuit 205, and may receive an amplified signal from the amplifier circuit 205. The ADC 215 may transmit an ADC output signal to the digital signal processing (DSP) circuit 255.

The DSP circuit 255 may comprise any suitable circuit and/or system to perform various digital signal processing. In an exemplary embodiment, the DSP circuit 255 may perform signal filtering, detect waveform characteristics, and compute a DC component of a signal. For example, the DSP circuit 255 may comprise a digital filter 220, a waveform characteristic detector 230, and a DC computation circuit 225, which may operate in combination or individually to decrease the settling time.

The digital filter 220 may be configured to remove certain frequencies of a signal and allow other desired frequencies to pass through. In one embodiment, the digital filter 220 is configured as a band-pass filter, which removes predetermined high and low frequencies and allows intermediate frequencies (those frequencies between the high and low frequencies) to pass through. Other embodiments may comprise either a low-pass filter or a high-pass filter. The digital filter 220 may be coupled between the output of the ADC 215 and an input of the waveform characteristic detector circuit 230.

The waveform characteristic circuit 230 measures various waveform characteristics from the digital filter 220. In various embodiments, the waveform characteristic circuit 230 may detect a maximum peak and a minimum peak of a back EMF signal. The waveform characteristic circuit 230 may further measure a resonance period $T_{rp}$ and a peak-to-peak value P-P from the back EMF signal according to the detected peaks. The waveform characteristic circuit 230 may be configured to compute a countermeasure value CM based on the resonance period. For example, the countermeasure value CM may be equal to the resonance period multiplied by a constant C, such as 0.75 (i.e., CM=$T_{rp}$×C). The constant may be selected according to the actuator 110 specifications, desired outcome, and the like. The waveform characteristic circuit 230 may operate in conjunction with a timing signal and/or a counter to measure the relevant characteristics. The waveform characteristic circuit 230 may be coupled to and configured to transmit an output signal S1 to the signal generator 275 via the register 235. For example, the output signal S1 may correspond to a suitable output value or reference such as the resonance period $T_{rp}$, the peak-to-peak value P-P, or the countermeasure value CM.

The DC computation circuit 225 may be configured to compute a DAC setting code that corresponds to a DC component of an output signal S2. The DC computation circuit 225 may be coupled between the signal generator 275 and the first DAC 210. For example, the DC computation circuit 225 may be coupled to and configured to receive an output of the signal generator 275. The DC computation circuit 225 may further coupled to and configured to transmit the DAC setting code to the first DAC 210. The DC computation circuit 225 may comprise any suitable circuit and/or system capable of calculating an actuator voltage $V_{act}$, calculating a transistor on-voltage $V_{uron}$, for example the on-voltage one of a first, second, third, or fourth transistors 310, 315, 320, 325, and calculating the DC component of the output signal S2. In various embodiments, the DC computation circuit 225 may compute the DC component (DAC setting code) by summing the actuator voltage $V_{act}$ and the transistor on-voltage $V_{uron}$ (e.g., DC component=$V_{act}$+$V_{uron}$). The DC computation circuit 225 may transmit the DAC setting code to the first DAC 210 forming a second feedback circuit to the amplifier circuit 205.

The register 235 may be configured to store relevant data and communicate with the DSP circuit 255, the signal generator 275, and or the ISP 130. For example, the register 235 may store various data from the ISP, such as a target position $T_{pos}$, as well as data from the DSP circuit 255, such as the peak-to-peak value P-P, the countermeasure value CM, and/or the resonance period $T_{rp}$. The data stored in the register 235 may be accessed by the signal generator 275 to perform comparisons, and/or generate an appropriate output signal S2. The register 235 may comprise any suitable memory or storage device capable of storing multiple variables at any given time.

The signal generator 275 may comprise any suitable circuit and/or system for comparing a new target position to a previous target position and generating the output signal S2. The signal generator 275 may be configured to generate the output signal S2 according to various inputs. For example, the signal generator 275 may generate the output signal S2 in response to the output signal S1 from the DSP circuit 255. The signal generator 275 may further generate the output signal in response to a new target position $T_{pos}$. The signal generator 275 may retrieve relevant data from the register 235, such as the target position $T_{pos}$, the resonance period $T_{rp}$, the countermeasure value CM, and/or the peak-to-peak value P-P, to generate an appropriate output signal S2.

Figure 14:
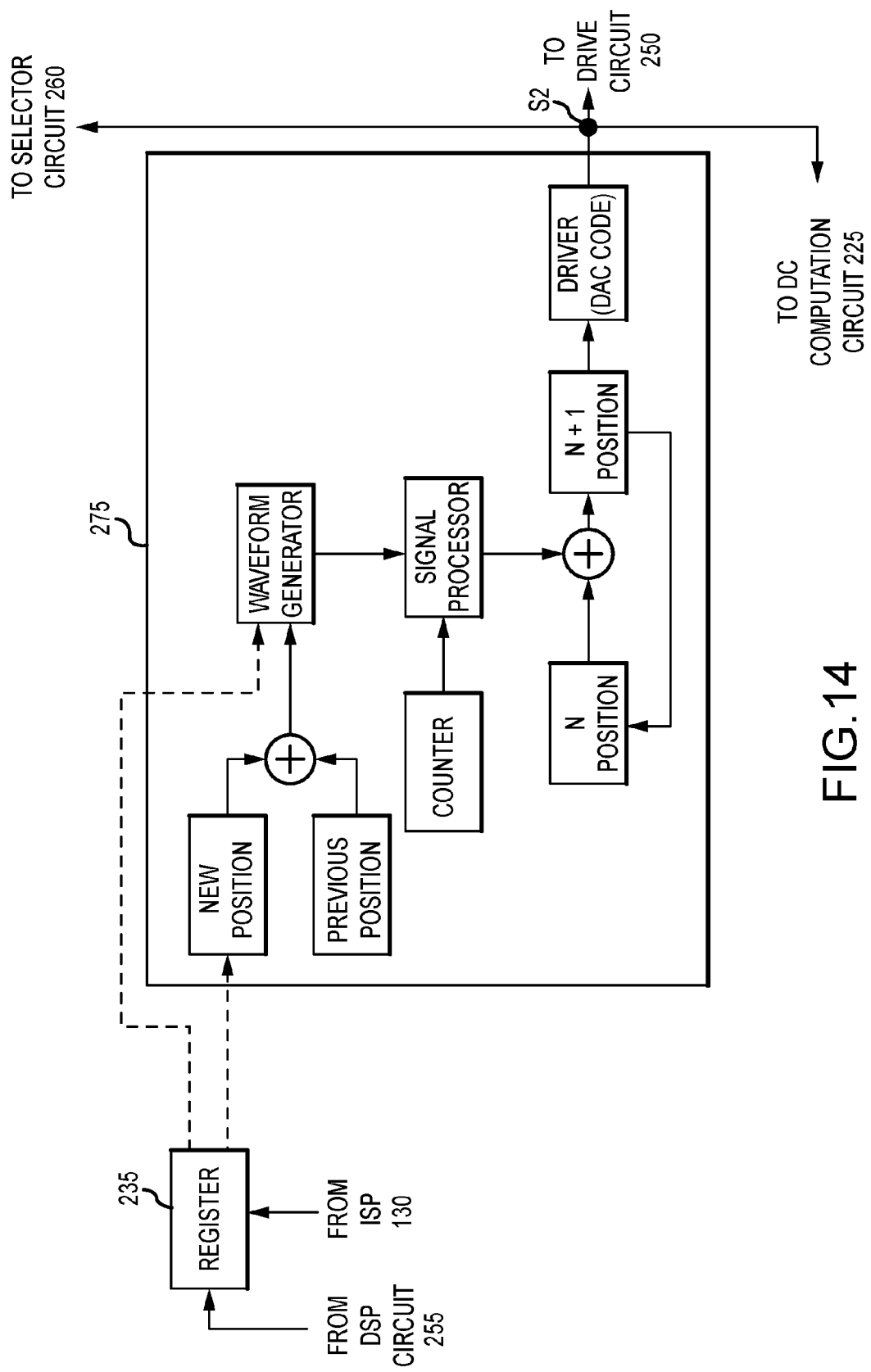
FIG. 14 is a block diagram of a signal generator in accordance with an exemplary embodiment of the present technology.
Figure 15:
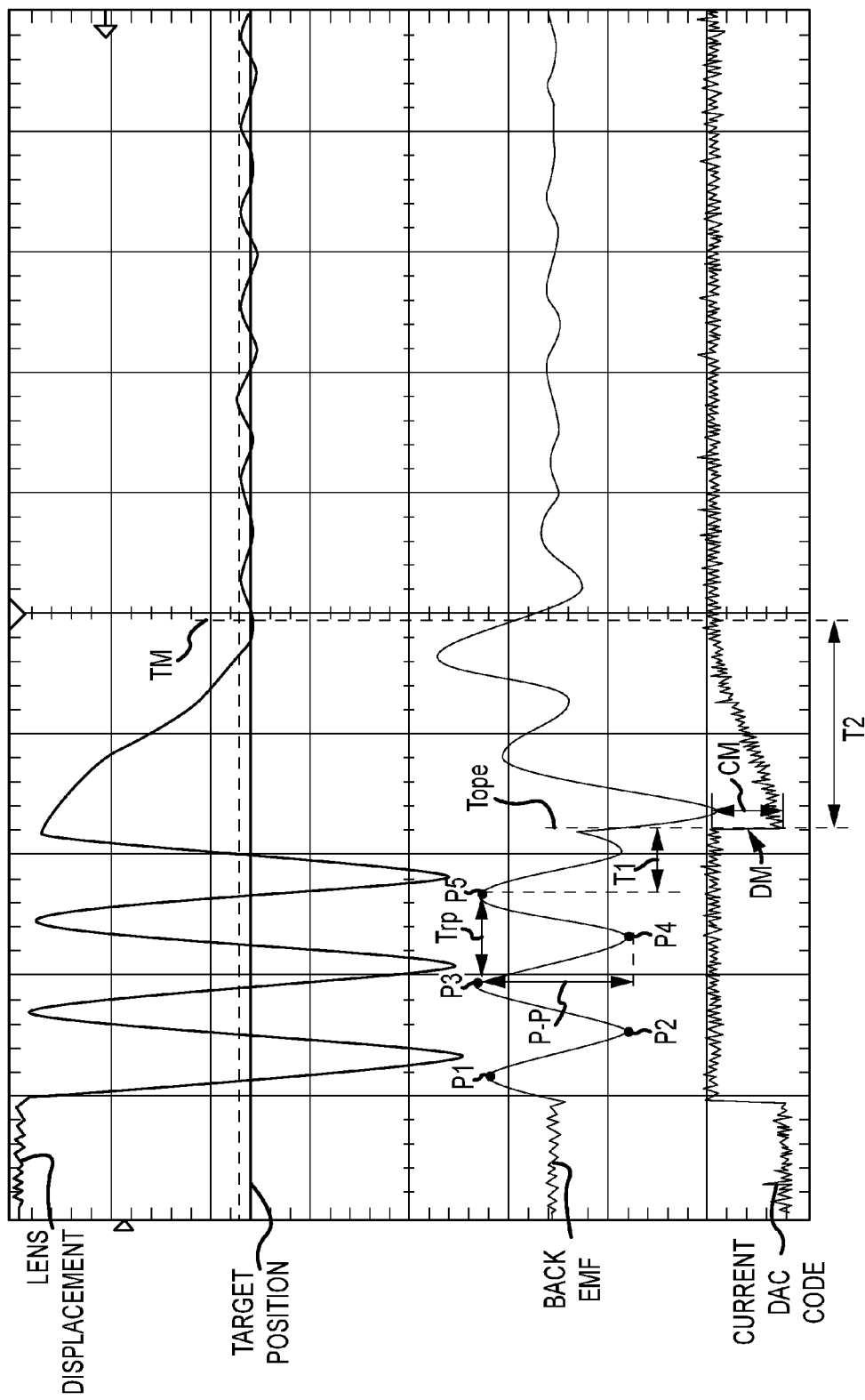
FIG. 15 are output waveforms representing the displacement of the lens relative to a target position, a back EMF, and a DAC code.

In an exemplary embodiment, the signal generator 275 utilizes the output values of the waveform characteristic circuit 230 (e.g., the resonance period $T_{rp}$, the peak-to-peak value P-P, and the countermeasure value CM) to generate the output signal S2. In various embodiments, the output signal S2 comprises a code (e.g., a DAC code). The output signal S2 may correspond to a current, a voltage, or a pulse width modulation. For example, the signal generator 275 may comprise the signal generator illustrated in FIG. 14 and described in U.S. Pat. No. 9,520,82. The signal generator 275 may be coupled to and configured to transmit the output signal S2 to the drive circuit 250.

In various embodiments, the signal generator 275 may comprise a DAC driver 245. The DAC driver 245 may convert a digital value to an analog value (e.g., a voltage or a current) and output the output signal S2 according to the target position $T_{pos}$ and/or the data from the DSP circuit 255, such as the countermeasure value CM, resonance period $T_{rp}$, and/or the peak-to-peak value P-P. The DAC driver 245 may output the output signal S2, wherein the output signal S2 may be a positive value or a negative value. The sign of the output signal S2 and the particular numerical value corresponds to the direction and magnitude, respectively, of the current (or voltage). The DAC driver 245 may communicate the output signal S2 to the drive circuit 250, wherein the drive circuit 250 responds to the output signal S2 by, for example, operating the transistors 310, 315, 320, 325 according to the sign and/or magnitude of the output signal S2. For example, a positive value may cause the current to flow from the first output terminal OUT1 to the second output terminal OUT2. Conversely, a negative value may cause the current to flow from the second output terminal OUT2 to the first output terminal OUT1. The DAC driver 245 may further communicate the sign (positive or negative) of the output signal S2 to the selection circuit 260.

The drive circuit 250 facilitates movement of the lens 135 to a desired position. The drive circuit 250 may comprise any suitable circuit for varying a voltage across the circuit in order to maintain a constant electrical current output in response to a first control signal. For example, the drive circuit 250 may receive and respond to the output signal S2 (the first control signal) from the signal generator 275 by generating various control signals. For example, the drive circuit 250 may generate and produce a drive signal $S_{DR}$. The drive circuit 250 may apply the drive signal $S_{DR}$ to the actuator 110, wherein the drive signal $S_{DR}$ may correspond to the target position $T_{pos}$ or the output signal S1 from the waveform characteristic circuit 230. The drive circuit 250 may facilitate movement of the lens 135 to achieve the target position (in response to the target position $T_{pos}$) or operate to reduce ringing (in response to the countermeasure value CM) by controlling the current to the actuator 110, which in turn controls the magnitude and direction of movement of the lens 135.

Figure 7:
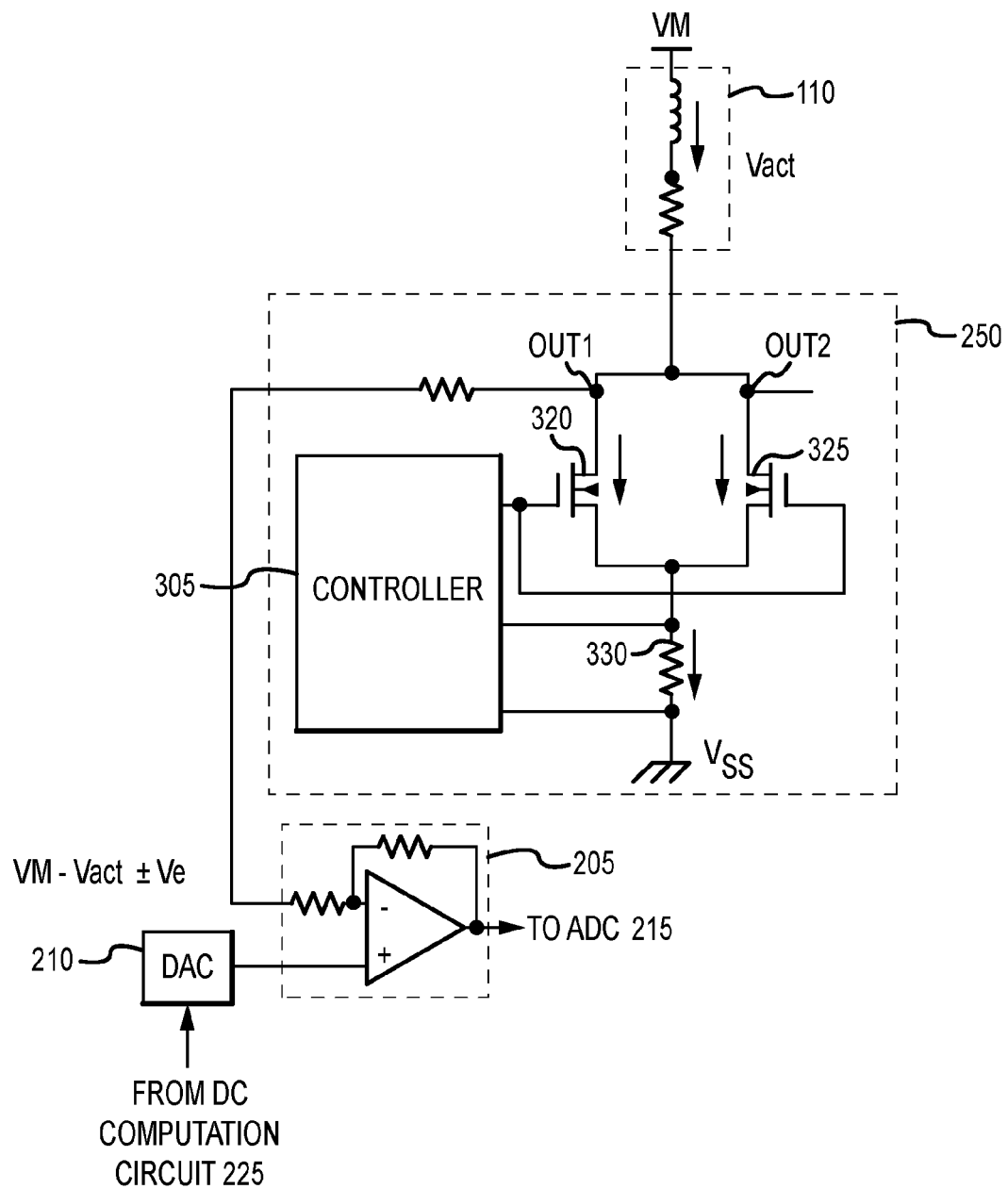
FIG. 7 is a circuit diagram of a drive circuit in accordance with an exemplary embodiment of the present technology.
Figure 8:
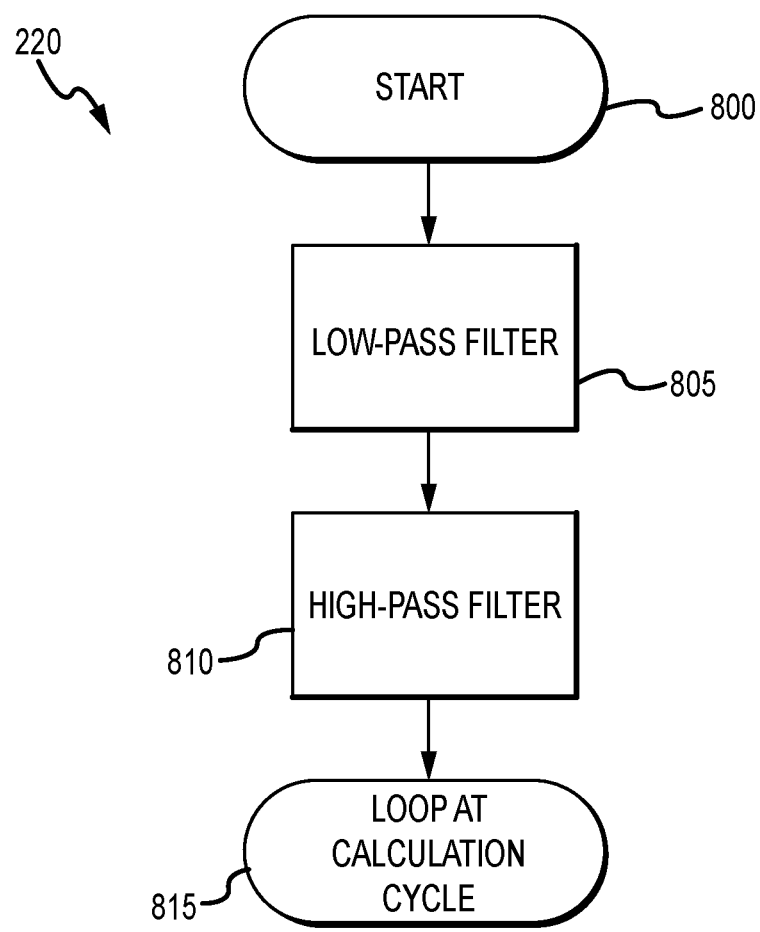
FIG. 8 is a flowchart of a signal filtering operation in accordance with an exemplary embodiment of the present technology.
Figure 9:
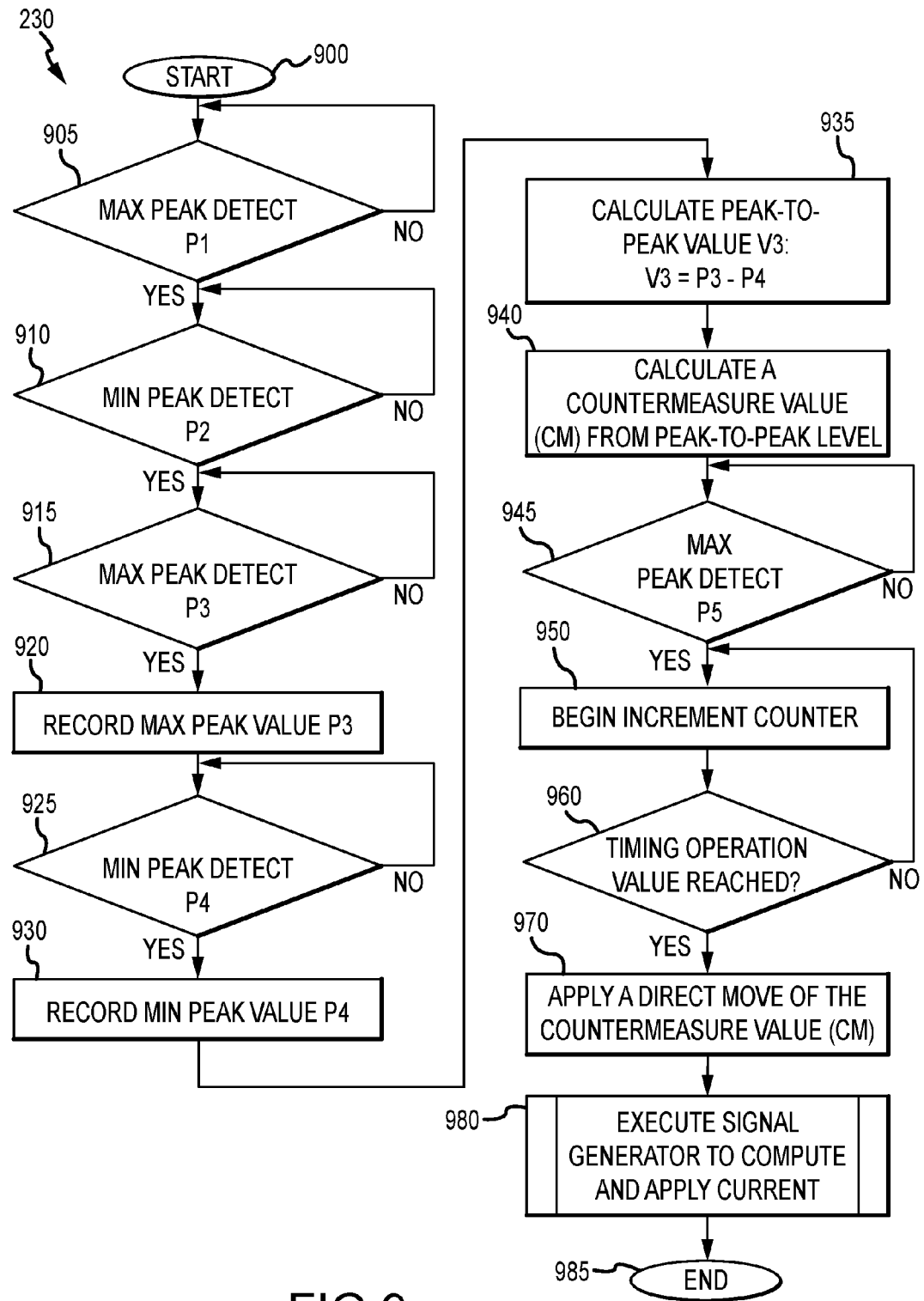
FIG. 9 is a flowchart of a waveform characteristic detector operation in accordance with an exemplary embodiment of the present technology.
Figure 10:
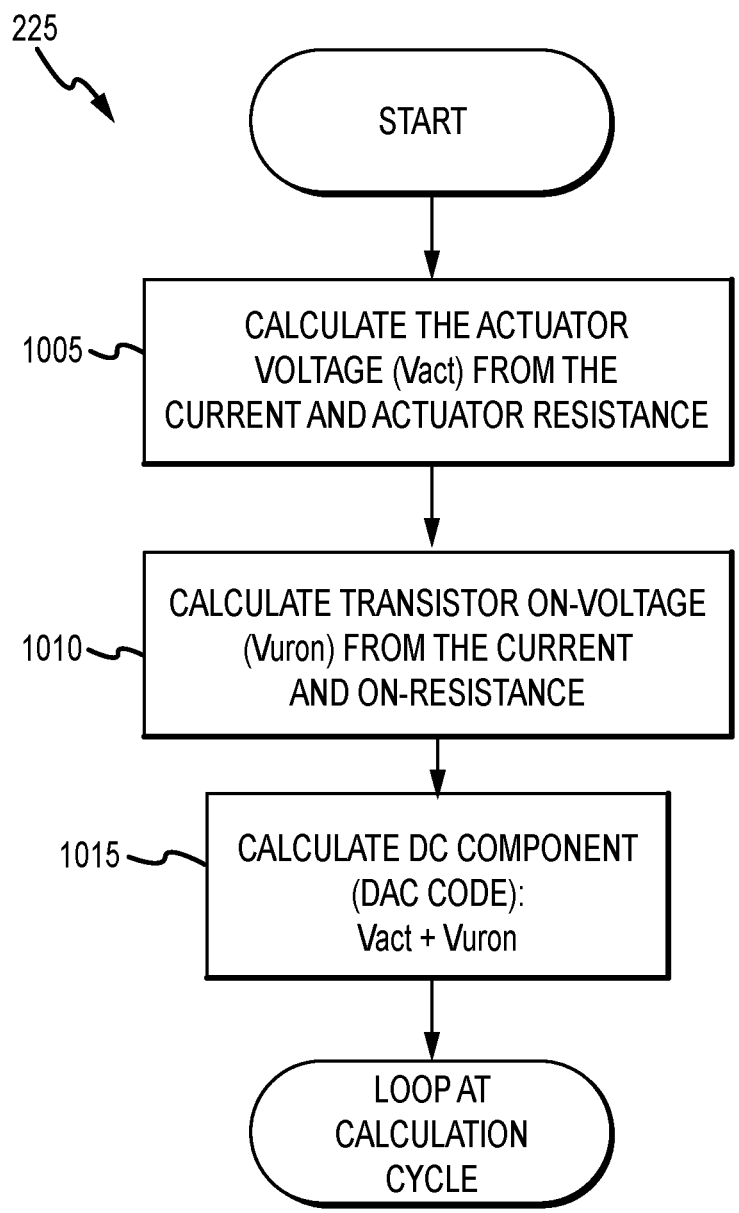
FIG. 10 is a flowchart of DC computation operation in accordance with an exemplary embodiment of the present technology.

The drive circuit 250 may further comprise a first output terminal OUT1 and a second output terminal OUT2. In various embodiments, both output terminals are coupled to the actuator 110 (i.e., a load). In some embodiments, however, only one output terminal is coupled to the actuator 110, for example as illustrated in FIG. 7.

In various embodiments, the drive circuit 250 may be coupled to the actuator 110 in such a way as to operate the actuator 110 in either a first direction or an opposite second direction. For example, the drive circuit 250 may generate current through both the first and second output terminals OUT1, OUT2, wherein the current may flow from the first output terminal OUT1 to the second output terminal OUT2 (i.e., the forward direction), or from the second output terminal OUT2 to the first output terminals OUT1 (i.e., the reverse direction). The direction of the current may be computed according to the desired target position.

Referring to FIGS. 3 through 6, the drive circuit 250 may comprise an H-bridge circuit configured to apply a voltage across the actuator 110 in one of two directions, and at least one control unit to control the H-bridge circuit. For example, in an exemplary embodiment, the drive circuit 250 comprises a logic unit 300 and a controller 305 coupled to the H-bridge circuit to control the voltage.

In various embodiments, the H-bridge circuit may comprise the first transistor 310, the second transistor 315, the third transistor 320, and the fourth transistor 325, wherein each transistor has a control electrode and a pair of current carrying electrodes. In various embodiments, each transistor may comprise a field effect transistor, wherein the control electrodes are gate electrodes and the current carrying electrodes are drain and source electrodes. The gate electrode, source electrode, and drain electrode may be referred to as the gate, the source, and the drain, respectively, or a gate terminal, a source terminal, and a drain terminal, respectively. Thus, the drain terminals of the first and second transistors 310, 315 are connected together and coupled for receiving a source of operating potential, for example VM. The source terminal of the first transistor 310 is connected to the drain terminal of the third transistor 320 to form the output terminal OUT1 and the source terminal of the second transistor 315 is connected to the drain terminal of the fourth transistor 325 to form the second output terminal OUT2. The source terminals of the third and fourth transistors 320, 325 are connected together and to a terminal of a current sense resistor 330. The remaining terminal of the current sense resistor 330 is coupled for receiving a source of operating potential, for example $V_{SS}$. The operating potential $V_{SS}$ may be a ground potential. The gate terminal of the first transistor 310 may be connected to a first output 335 of the logic circuit 300 and the gate terminal of the second transistor 315 may be connected to a second output 340 of the logic circuit 300. The gate terminal of the third transistor 320 may be connected to the gate terminal of the fourth transistor 325 and to an output terminal of the controller 305.

The controller 305 may comprise an amplifier (not shown) and a second DAC (not shown), for example as described in U.S. Pat. No. 9,520,823. According to various embodiments, the logic circuit 300 and the controller 305 may be configured to selectively activate (turn on) one or more of the transistors 310, 315, 320, 325. For example, the logic circuit 300 and/or the controller 305 may generate a second control signal and transmit the second control signal to the gate of a particular transistor.

The selector circuit 260 may be configured to selectively couple one of the driver outputs (e.g., the first output terminal OUT1 or the second output terminal OUT2) to the amplifier circuit 205 according to the first control signal (e.g., the output signal S2). For example, the selector circuit 260 may be coupled to both the first and second output terminals OUT1, OUT2. The selector circuit 260 may further be communicatively coupled to the output of the signal generator 275 and receive the output signal S2 from the signal generator 275. The selector circuit 260 may respond to the output signal S2 by selecting one of the output terminals OUT1, OUT2. For example, if the selector circuit 260 receives an output signal S2 with a positive sign (+) from the signal generator 275, then the selector circuit 260 may couple the second output terminal OUT2 to the amplifier circuit 205. If the selector circuit 260 receives an output signal S2 with a negative sign (−) from the signal generator 275, then the selector circuit 260 may couple the first output terminal OUT1 to the amplifier circuit 205. The selector circuit 260 may comprise any suitable circuit and/or system to select one of various inputs according to the output signal S2, such as a conventional switch SW.

In general, a linear resonant actuator (LRA) (e.g., the actuator 110) is a vibration motor that produces an oscillating force across a single axis and relies on an AC voltage to drive a voice coil pressed against a moving mass connected to a spring. When the voice coil is driven at the resonant frequency of the spring, the entire actuator vibrates with a perceptible force. Although the frequency and amplitude of a linear resonant actuator may be adjusted by changing the AC input, the actuator must be driven at its resonant frequency to generate a meaningful amount of force for a large current. Since the voice coil is driven by an AC current, the frequency and amplitude may be independently modified. Although the frequency can be changed, the LRA will typically be operated within a narrow frequency range to optimize its power consumption—if the device is driven at the resonant frequency of the spring, it will consume less power to produce a vibration of equal magnitude.

The typical start time for an LRA is relatively quick, for example approximately 5-10 ms (milliseconds). This speed is a result of the immediate movement of the magnetic mass as current is applied to the voice coil inside of the device. Unfortunately, the stop time (i.e., settling time) of an LRA can take up to 300 ms to stop vibrating (also referred to as "ringing") due to the continued storage of kinetic energy in the internal spring during operation. The settling time is further increased by the back EMF induced by the actuator 110 when external vibrations are applied to the actuator 110.

Figure 11A:
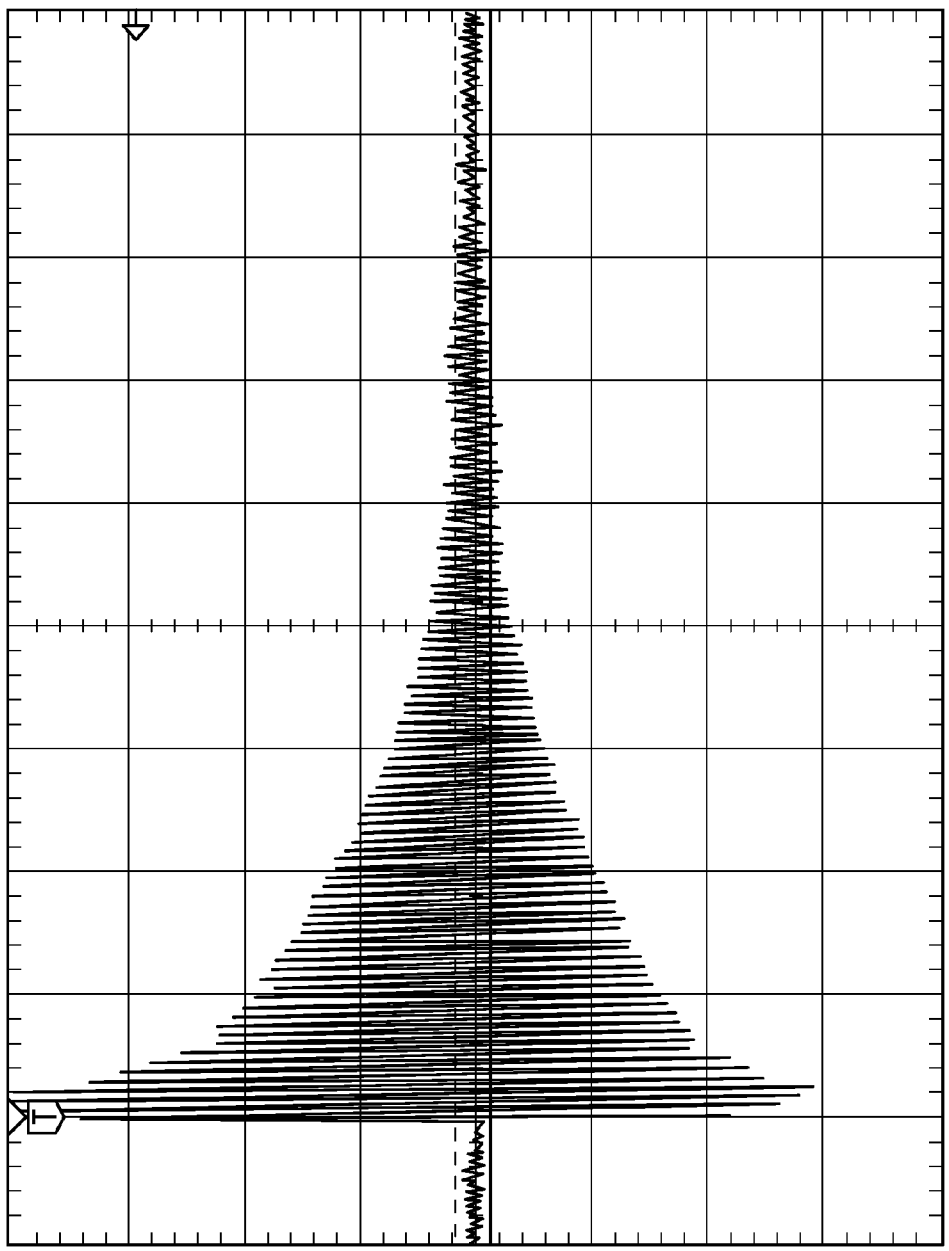
FIG. 11A is an output waveform representing a displacement of the lens relative to a target position according to a conventional prior art device.
Figure 11B:
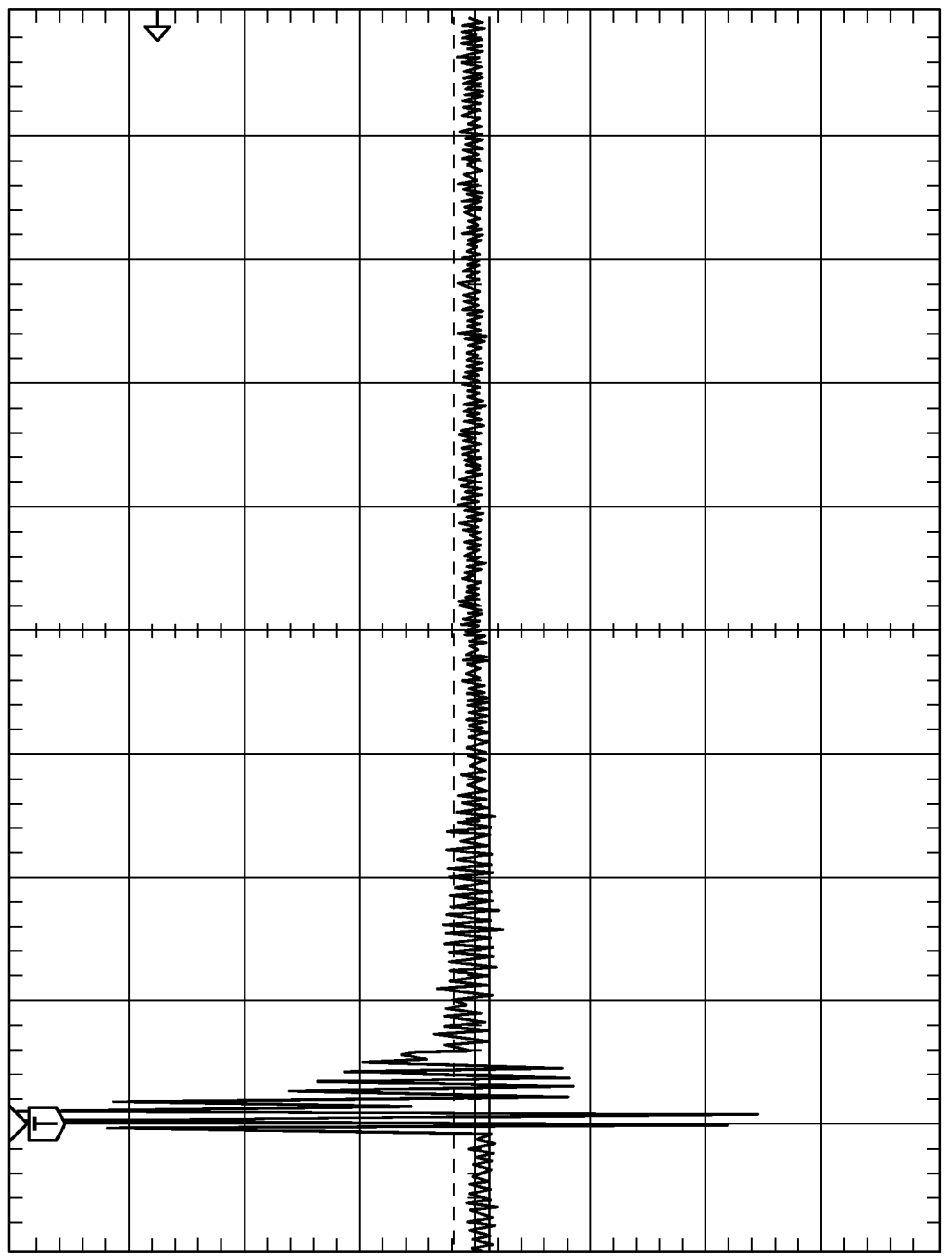
FIG. 11B is an output waveform representing the displacement of the lens relative to a target position in accordance with an exemplary embodiment of the present technology.
Figure 12A:
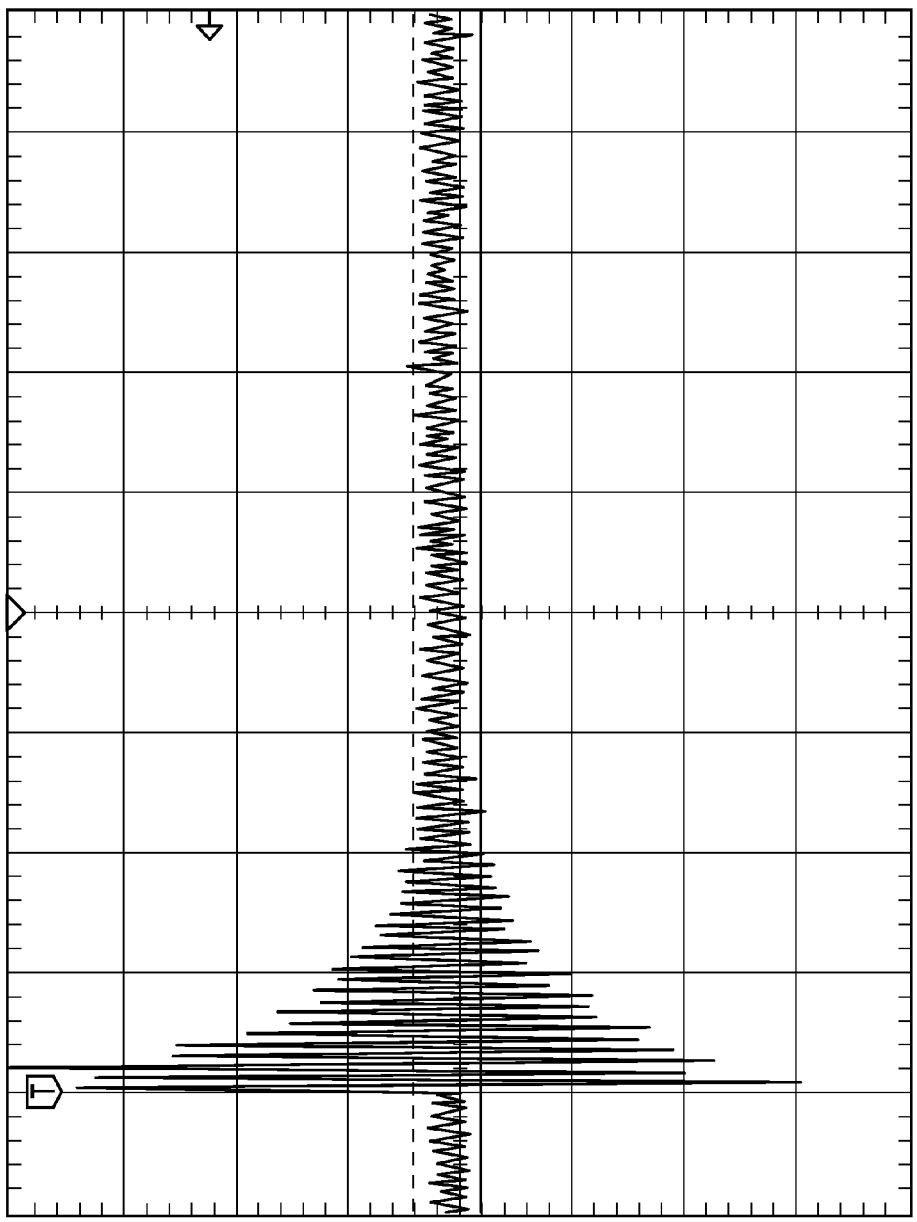
FIG. 12A is an output waveform representing the displacement of the lens relative to a target position utilizing a unidirectional-type actuator according to a conventional prior art device.
Figure 12B:
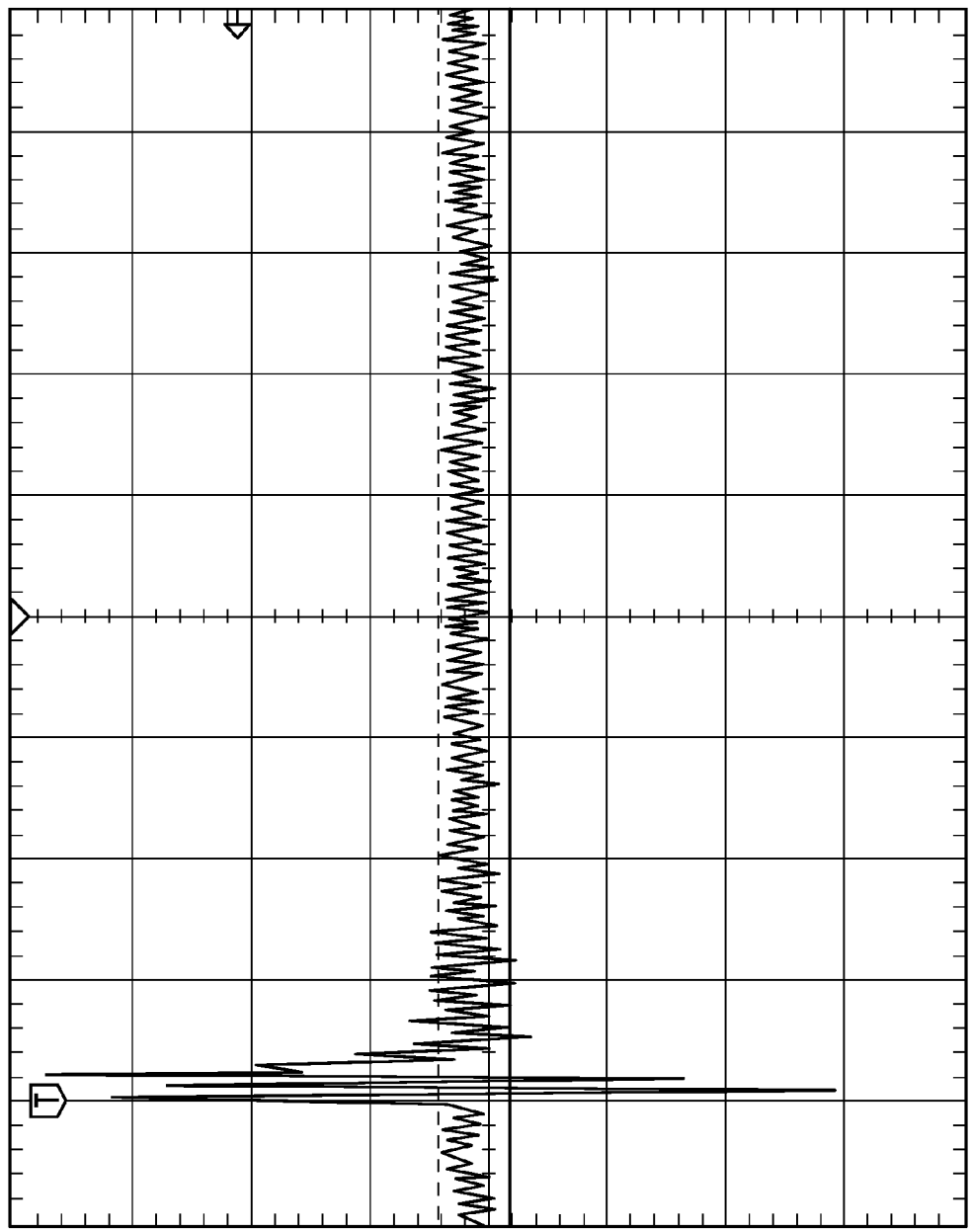
FIG. 12B is an output waveform representing the displacement of the lens relative to a target position utilizing a unidirectional-type actuator in accordance with an exemplary embodiment of the present technology.
Figure 13A:
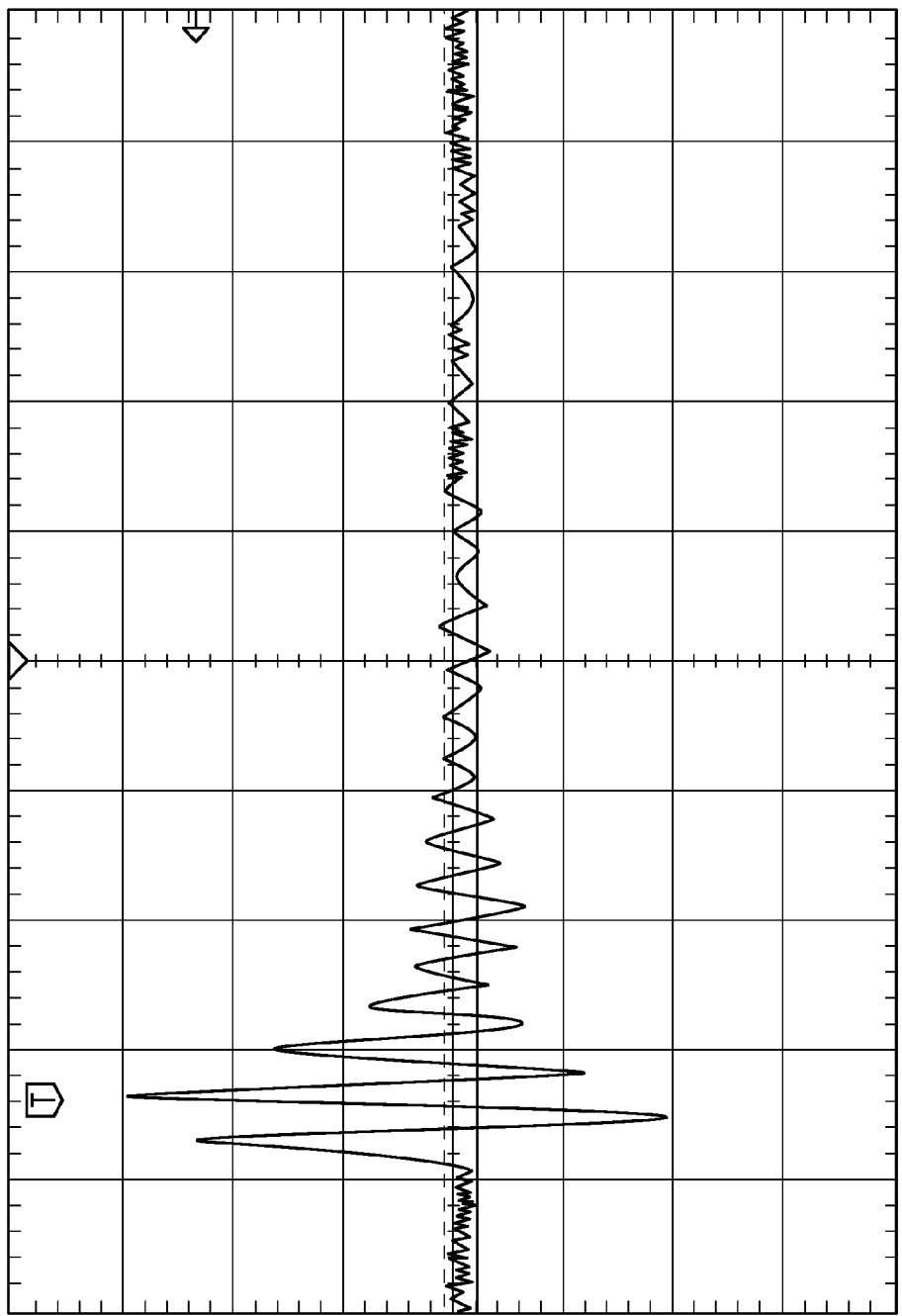
FIG. 13A is an output waveforms representing the displacement of the lens relative to a target position utilizing a bidirectional-type actuator according to a conventional prior art device.
Figure 13B:
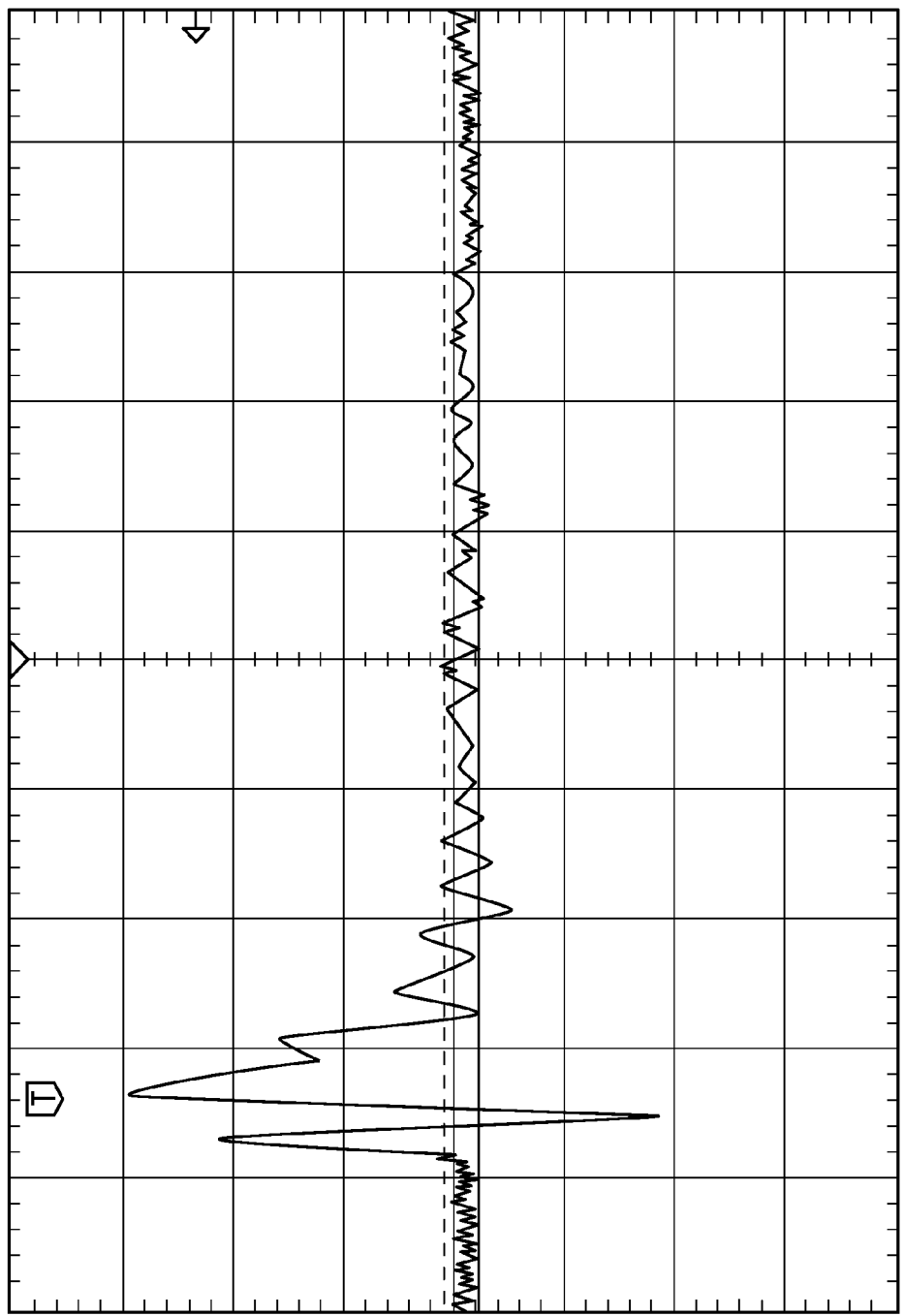
FIG. 13B is an output waveform representing the displacement of the lens relative to a target position utilizing a bidirectional-type actuator in accordance with an exemplary embodiment of the present technology.

According to various embodiments, the methods and apparatus for actuator control operate to reduce the settling time of the actuator 110 by utilizing measured characteristics of the back EMF. The methods and apparatus operate to measure and reduce the effects of the back EMF induced by the actuator 110. The methods and apparatus may further implement various digital signal processing functions to filter various frequencies, remove a DC component of a signal, and measure characteristics of the back EMF, such as the resonance period and peak-to-peak value. The methods and apparatus may further operate to stop the current going to the actuator 110 and then gradually increase the current at appropriate times as determined according to the measured back EMF characteristics. As such, the method and apparatus may produce a lens displacement output waveform (FIG. 11B) that converges at the target position in less time than an existing method and apparatus (FIG. 11A). For example, as illustrated in FIG. 11B, the lens displacement output waveform converges at the target position in approximately 150 ms. Conversely, an existing method and apparatus produces a lens displacement output waveform that converges at the target position in approximately 1 s, for example as illustrated in FIG. 11A.

In operation, and referring to FIGS. 1-6, 8-10, and 14-16, the signal generator 275 may first receive the target position $T_{pos}$ from the ISP 130 via the register 235. The signal generator 275 may generate the output signal S2 according to the operation described in U.S. Pat. No. 9,520,823 and transmit the output signal S2 to the drive circuit 250 which in turn provides the drive signal $S_{DR}$ (e.g., a current or voltage with a magnitude and a direction) to the actuator 110.

Figure 16:
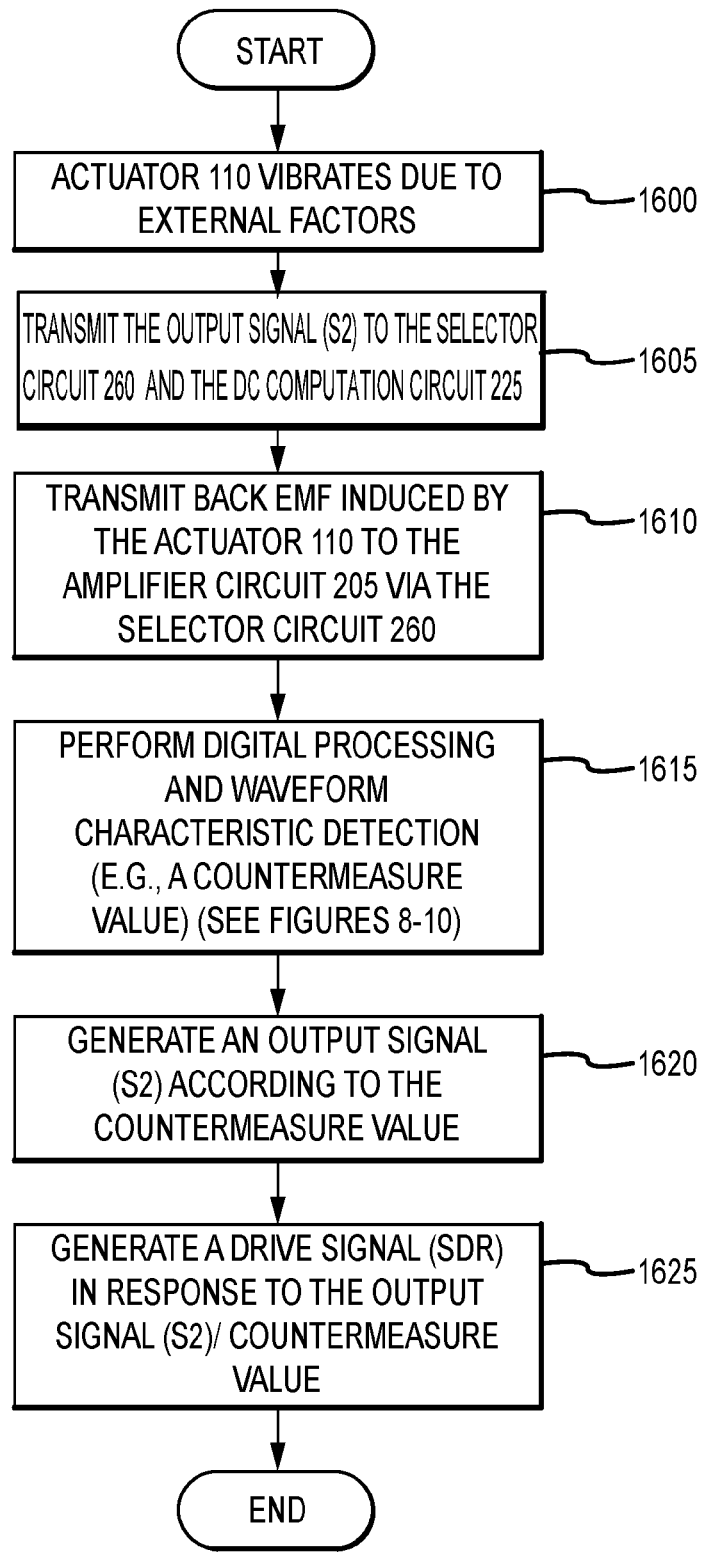
FIG. 16 is a flowchart of an actuator control operation in accordance with an exemplary embodiment of the present technology.

During operation of the device 100, and referring to FIG. 16, a user may inadvertently apply external vibrations to the device 100, which induces the back EMF (1600). The back EMF may increase the amplitude of the drive signal $S_{DR}$, thereby increasing the settling time of the lens 135.

The selector circuit 260 may then transmit the back EMF that is induced when the actuator 110 is operated. The selector circuit 260 may receive the output signal S2 from the signal generator 275 (1605) and respond to the output signal S2 by selecting either the first output terminal OUT1 or the second output terminal OUT2 to be transmitted to the amplifier circuit 205 (1610). It should be noted that at step 1605, the output signal S2 corresponds to a most recent target position $T_{pos}$.

Figure 5:
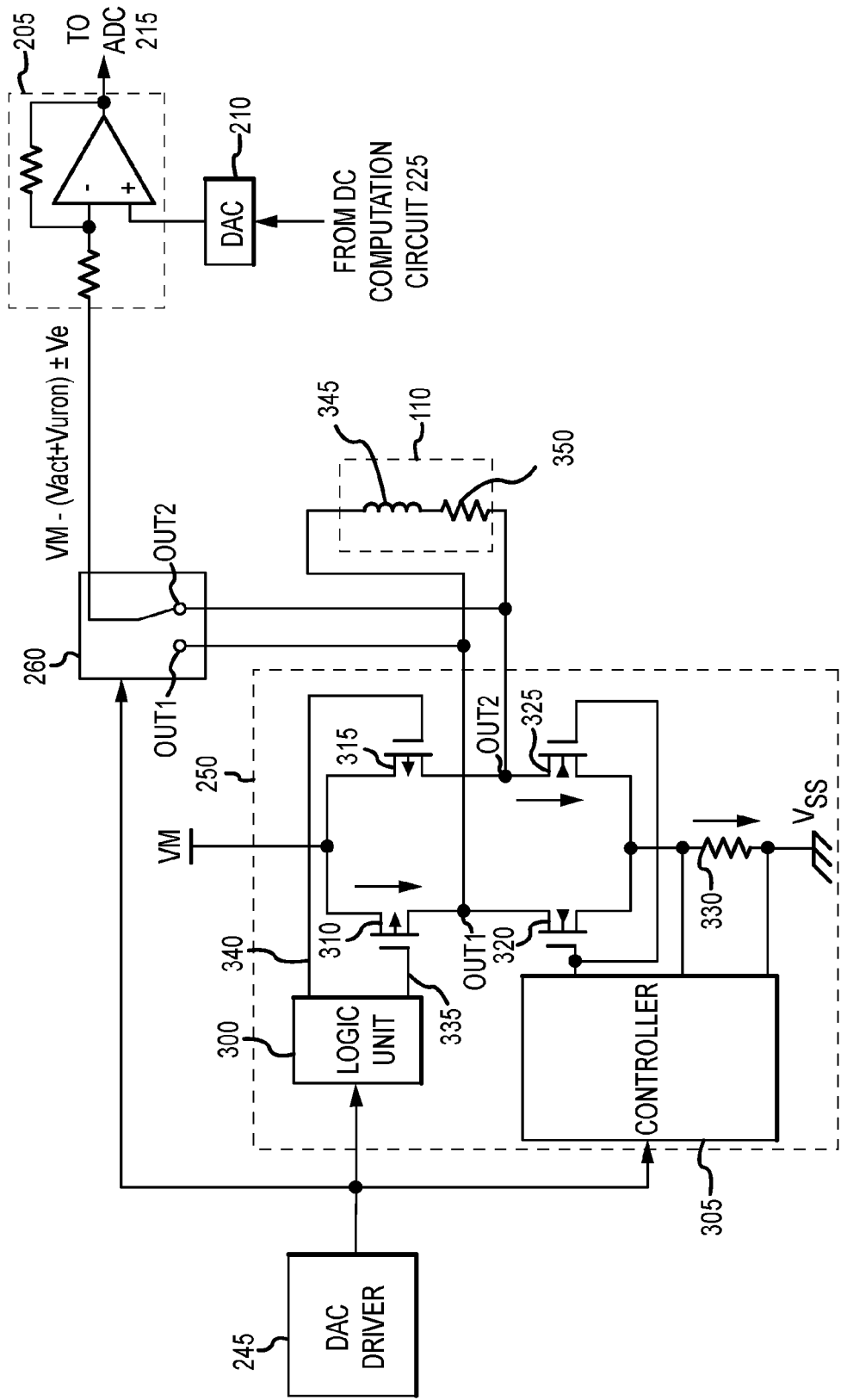
FIG. 5 is a circuit diagram of the autofocus system with the current flowing from the first output terminal to the second output terminal in accordance with an exemplary embodiment of the present technology.
Figure 6:
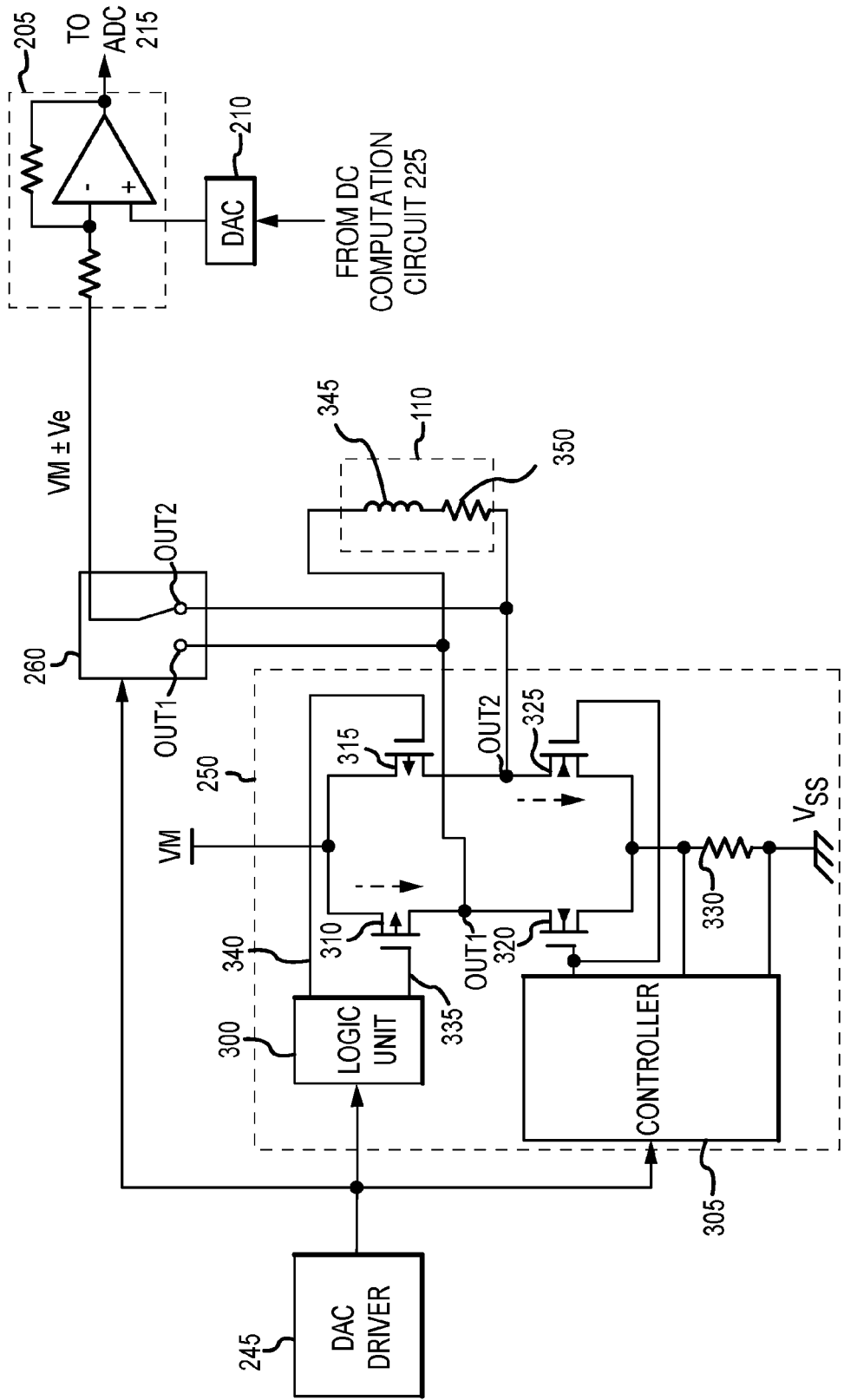
FIG. 6 is a circuit diagram of an autofocus system with the second output terminal selected and no current flowing in accordance with an exemplary embodiment of the present technology.

In various embodiments, if the sign of the output signal S2 is positive, then the current is flowing from the first output terminal OUT1 to the second output terminal OUT2, and the selector circuit 260 selects the second output terminal OUT2 to be transmitted to the amplifier circuit 205, for example as illustrated in FIG. 5. When the current is flowing from the first output terminal OUT1 to the second output terminal OUT2, the voltage at the second output terminal OUT2 may be describe by the equation: OUT2=VM−($V_{act}$+$V_{uron\_310}$)+/−$V_e$, where VM is the source voltage, $V_{act}$ is the actuator voltage, $V_{uron\_310}$ is the on-voltage of the first transistor 310, and $V_e$ is the back EMF. If the sign of the output signal S2 is negative, then the current is flowing from the second output terminal OUT2 to the first output terminal OUT1, and the selector circuit 260 selects the first output terminal OUT1 to be transmitted to the amplifier circuit 205, for example as illustrated in FIG. 3. When the current is flowing from the second output terminal OUT2 to the first output terminal OUT1, the voltage at the first output terminal OUT1 may be describe by the equation: OUT1=VM−($V_{act}$+$V_{uron\_315}$)+/−$V_e$, where VM is the source voltage, $V_{act}$ is the actuator voltage, $V_{uron\_315}$ is the on-voltage of the second transistor 315, and $V_e$ is the back EMF. When no current is flowing through the transistors, the output voltage on the output terminals is described by the following: OUT1/OUT2=VM+/−$V_e$.

Substantially simultaneously as the signal generator 275 transmits the output signal S2 to the selector circuit 260, the signal generator 275 may transmit the output signal S2 to the DC computation circuit 225 (1605). DC computation circuit 225 may compute the DC component of the output signal S2. For example, and referring to FIG. 10, the DC computation circuit 225 may utilize the current and the resistance of the actuator 110 to compute the actuator voltage $V_{act}$ (1005). The DC computation circuit 225 may then compute the relevant transistor on-voltage $V_{uron}$ utilizing the current through the relevant transistor and the on-resistance of the relevant transistor (1010). The DC computation circuit 225 may then compute add the actuator voltage $V_{act}$ and the on-voltage $V_{uron}$ to determine the appropriate DAC setting code (1015). The DC computation circuit 225 then transmits the DAC setting code to the first DAC 210, where the first DAC 210 interprets the code and outputs an associated analog voltage to the amplifier circuit 205. For example, in the case where the first output terminal OUT1 is selected, the first DAC 210 may transmit a signal with a voltage V1 described by: V1=VM−($V_{act}$+$V_{uron\_310}$)−α ($V_{act}$+$V_{uron\_310}$), where α is a fixed variable, for example 12 or 50. In the case where the second output terminal OUT2 is selected, the first DAC 210 may transmit a signal with a voltage V2 described by: V2=VM−($V_{act}$+$V_{uron\_315}$)−α ($V_{act}$+$V_{uron\_315}$). As such, the amplifier circuit 205 effectively removes the DC component of the selected output signal (e.g., OUT1 or OUT2) and only the back EMF component ($V_e$) remains. The amplifier circuit 205 may then transmit the back EMF signal to the ADC 215 to be digitized. The ADC 215 may then transmit a digitized back EMF signal to the DSP circuit 255.

The DSP circuit 255 may then perform various digital processing and waveform characteristic detection on the back EMF signal (1615). The DSP circuit 255 may first filter the back EMF signal with the digital filter 220. For example, and referring to FIG. 8, the digital filter 220 may be a band-pass filter wherein the digital filter 220 receives the digitized signal from the ADC 215 (800) and filters the back EMF signal with a low-pass filter (805) to attenuate frequencies above a predetermined threshold and pass those frequencies below the predetermined threshold. The digital filter 220 may then filter the signal with a high-pass filter (810) to attenuate frequencies below a predetermined threshold and pass those frequencies above the predetermined threshold. As such, the digital filter 220 outputs a filtered back EMF signal. When the next signal is delivered, the process starts over.

The filtered back EMF signal is then transmitted to the waveform characteristic circuit 230. For example, and referring to FIGS. 9 and 15, the waveform characteristic circuit 230 first receives the filtered back EMF signal from the digital filter 220 (900). The waveform characteristic circuit 230 then determines if a first maximum peak P1 has been detected (905). If the first maximum peak P1 is not detected, the waveform characteristic circuit 230 continues to receive signal data until the first maximum peak P1 is detected. Once the first maximum peak P1 is detected, the waveform characteristic circuit 230 then determines if a first minimum peak P2 is detected (910). If the first minimum peak P2 is not detected, the waveform characteristic circuit 230 continues to receive back EMF signal data until the first minimum peak P2 is detected. In various embodiments, the waveform characteristic circuit 230 does not use the first maximum and minimum peaks P1, P2, as the beginning of the signal may generally be prone to noise. As such, the waveform characteristic circuit 230 then determines if a second maximum peak P3 has been detected (915). If the second maximum peak P3 is not detected, the waveform characteristic circuit 230 continues to receive signal data until the second maximum peak P3 is detected. Once the second maximum peak P3 is detected, the waveform characteristic circuit 230 records the second maximum peak P3 value in a storage device (920). Once again, the waveform characteristic circuit 230 then determines if a second minimum peak P4 has been detected (925). If the second minimum peak P4 is not detected, the waveform characteristic circuit 230 continues to receive signal data until the second minimum peak P4 is detected. Once the second minimum peak P4 is detected, the waveform characteristic circuit 230 records the second minimum peak P4 value in a storage device (930). The waveform characteristic circuit 230 may then utilize the second maximum and minimum peak P3, P4 values to compute a peak-to-peak value V3 (935).

The waveform characteristic circuit 230 may utilize the peak-to-peak value V3 to compute the countermeasure value CM (940). The countermeasure value CM corresponds to an amount of current needed to facilitate settling. For example, in one embodiment, the countermeasure value CM may be equal to the peak-to-peak value V3 multiplied by a second constant C2 (i.e., CM=V3*C2), where the second constant C2 is selected according to the particular actuator 110 used and/or the particular application. In other embodiments, the countermeasure value CM may be determined according to a look-up table based on the peak-to-peak value V3.

The waveform characteristic circuit 230 then determines if a third maximum peak P5 has been detected (945). If the third maximum peak P5 is not detected, the waveform characteristic circuit 230 continues to receive signal data until the third maximum peak P5 is detected. Once the third maximum peak P5 is detected, the waveform characteristic circuit 230 begins incrementing a counter (not shown) (950). The counter will continue to increment until a predetermined count value (e.g., a trigger time value $T_{ope}$) has been reached (960). The time period beginning at the third maximum peak P5 and ending with the trigger time value $T_{ope}$ may be referred to as the first time period T1 (or the trigger time period). The trigger time value $T_{ope}$ may be computed according to the resonance period $T_{rp}$, for example the trigger time value $T_{ope}$ may be equal to the resonance period $T_{rp}$ multiplied by the first constant C1, such as 0.75. The trigger time value $T_{ope}$ may be selected according to the particular characteristics of the actuator, the particular application, and/or the desired outcome. Once the trigger time value $T_{ope}$ has been reached, the DSP circuit 255 may generate an activation signal to transmit the output signal S1 to the signal generator 275, via the register 235, to set the drive signal $S_{DR}$ (current) to the countermeasure value CM (1620) and apply the drive signal $S_{DR}$ to the actuator 110 (970), wherein the countermeasure value CM is applied in a direct move DM manner. As such, the output signal S2 corresponds to the countermeasure value CM and the drive circuit 250 applies the drive signal $S_{DR}$ (e.g., current), in response to the computed countermeasure value CM, to the actuator 110 at the end of the trigger time period.

After the direct move DM is completed, the waveform characteristic circuit 230 may then signal to the signal generator 275 to resume normal signal generation (980) utilizing the most recent target position $T_{pos}$ until the lens reaches the target position. For example, the during a second time period T2, the signal generator 275 may generate the driver signal according to U.S. Pat. No. 9,520,823. The end of the second time period T2 is denoted as TM and refers to the moment in time when the lens has reached the target position.

During operation, if the register 235 receives a new target position $T_{pos}$ from the ISP 130, the signal generator 275 may terminate the process outlined in FIGS. 8-10 and 16, and the signal generator 275 may operate to move the actuator 110 according to the new target position $T_{pos}$. Therefore, instead of the output signal S2 representing the countermeasure value CM, the output signal S2 will represent the new target position $T_{pos}$.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A control circuit, capable of operating an actuator, having a drive circuit and a signal generator responsive to a target position, comprising:
  a digital signal processing circuit coupled to:
    an input of the signal generator; and
    an output of the drive circuit; and
  configured to:
    measure waveform characteristics of a back electromotive force (EMF) induced by the actuator; and
    compute a countermeasure value according to the back EMF; and
  a selector circuit coupled to the signal generator and the drive circuit, wherein the selector circuit is configured to selectively couple one of a first output terminal and a second output terminal of the drive circuit to the digital signal processing circuit according to the target position;
  wherein the drive circuit is configured to operate the actuator according to the countermeasure value.

2. The control circuit according to claim 1, wherein the digital signal processing circuit comprises:
  a digital filter comprising:
    a low pass filter; and
    a high pass filter;
  a waveform characteristic circuit configured to compute at least one of a resonance period and a peak-to-peak value of the back EMF; and
  a DC computation circuit configured to compute a DC component of the back EMF.

3. The control circuit according to claim 2, wherein the digital signal processing circuit is further configured to:
  compute a trigger time value according to the resonance period; and
  count a trigger time period that ends at the trigger time value.

4. The control circuit according to claim 3, wherein:
  the waveform characteristic circuit is configured to detect:
    a maximum peak value; and
    a minimum peak value; and
  the trigger time period begins at one of the detected maximum peak value and the minimum peak value.

5. The control circuit according to claim 3, wherein the digital signal processing circuit is further configured to generate an activation signal at the end of a trigger time period.

6. The control circuit according to claim 5, wherein the drive circuit applies a current, in response to the computed countermeasure value, to the actuator at the end of the trigger time period.

7. The control circuit according to claim 1, wherein the digital signal processing circuit further computes:
  a resonance period of the back EMF; and
  a trigger time period according to the resonance period, wherein the trigger time period begins at one of: a maximum peak and a minimum peak of the back EMF.

8. The control circuit according to claim 1, further comprising:
  an amplifier circuit coupled between an output of the selector circuit and an input of the digital signal processing circuit, comprising:
    a first terminal; and
    a second terminal;
    wherein the output of the selector circuit is coupled to the first terminal; and
  a digital to analog converter comprising:
    an input terminal; and
    an output terminal;
    wherein the input terminal is coupled to the digital signal processing circuit and the output terminal is coupled to the second terminal of the amplifier circuit.

9. The control circuit according to claim 1, wherein the countermeasure value is computed according to a peak-to-peak value of the back EMF.

10. A method for controlling an actuator, comprising:
  selectively coupling one of a plurality of drive circuit output terminals having a back electromotive force (EMF) to a digital signal processing circuit;
  computing a peak-to-peak value of the back EMF;
  computing a countermeasure value according to the computed peak-to-peak value;
  computing a trigger time value; and
  applying a current to the actuator that corresponds to the countermeasure value at the trigger time value.

11. The method for controlling an actuator according to claim 10, wherein the output terminal is selected according to a direction and magnitude of a current through the actuator.

12. The method for controlling an actuator according to claim 10, further comprising:
  computing a resonance period of the back EMF; and
  computing a DC component of the back EMF.

13. The method for controlling an actuator according to claim 12, wherein the trigger time value is computed according to the resonance period.

14. The method for controlling an actuator according to claim 10, further comprising:
  counting a trigger time period that ends at the trigger time value; and
  generating an activation signal at the end of the trigger time period.

15. The method for controlling an actuator according to claim 14, wherein the trigger time period begins at one of: a detected maximum peak value and a detected minimum peak value.

16. An imaging system capable of performing autofocus with an actuator, comprising:
  an image signal processor;
  a camera module coupled to the image signal processor, comprising:
    an image sensor coupled to the image signal processor, wherein the image sensor transmits image data to the image signal processor; and
    a control circuit coupled to the image signal processor and configured to receive a target position from the image signal processor, wherein the control circuit comprises:
      a signal generator configured to transmit an output signal at an output terminal; wherein the output signal represents the target position at a first time and a countermeasure value at a second time;

a drive circuit, coupled to the signal generator and the actuator, comprising:
  a first output terminal; and
  a second output terminal;
  wherein the drive circuit receives the output signal and is configured to apply a drive signal to the actuator in response to the output signal;
a selector circuit coupled to:
  the output terminal of the signal generator;
  the first output terminal; and
  the second output terminal;
  wherein the selector circuit is configured to select one of the first output terminal and the second output terminal in response to the target position; and
a digital signal processing circuit coupled to the selector circuit and configured to:
  compute a peak-to-peak value of a back EMF induced by the actuator;
  compute the countermeasure value according to the peak-to-peak value; and
  compute a DC component of the back EMF.

17. The imaging system according to claim 16, wherein the digital signal processing circuit further computes:
a resonance period of the back EMF; and
a trigger value according to the resonance period.

18. The imaging system according to claim 16, further comprising:
an amplifier circuit coupled between an output of the selector circuit and an input of the digital signal processing circuit, comprising:
  a first terminal; and
  a second terminal;
  wherein the output of the selector circuit is coupled to the first terminal; and
a digital to analog converter comprising:
  an input terminal; and
  an output terminal;
  wherein the input terminal is coupled to the digital signal processing circuit and the output terminal is coupled to the second terminal of the amplifier circuit.

19. The imaging system according to claim 16, wherein the digital signal processing circuit is further configured to generate an activation signal at the end of a trigger time period.

20. The imaging system according to claim 19, wherein the driver circuit applies a current corresponding to the countermeasure value at the end of the trigger time period.

* * * * *